US011903069B2

(12) United States Patent
Sengupta et al.

(10) Patent No.: US 11,903,069 B2
(45) Date of Patent: Feb. 13, 2024

(54) BEAM FAILURE RECOVERY IN SECONDARY CELLS

(71) Applicant: Intel Corporation, Santa Clara, CA (US)

(72) Inventors: Avik Sengupta, San Jose, CA (US); Alexei Davydov, Nizhny Novgorod (RU); Bishwarup Mondal, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 16/994,259

(22) Filed: Aug. 14, 2020

(65) Prior Publication Data

US 2020/0383167 A1    Dec. 3, 2020

Related U.S. Application Data

(60) Provisional application No. 62/890,524, filed on Aug. 22, 2019, provisional application No. 62/888,372, filed on Aug. 16, 2019.

(51) Int. Cl.
| | |
|---|---|
| *H04W 36/30* | (2009.01) |
| *H04W 76/19* | (2018.01) |
| *H04B 7/06* | (2006.01) |
| *H04W 74/08* | (2009.01) |
| *H04W 72/21* | (2023.01) |
| *H04W 72/23* | (2023.01) |

(52) U.S. Cl.
CPC .......... *H04W 76/19* (2018.02); *H04B 7/0617* (2013.01); *H04W 72/21* (2023.01); *H04W 72/23* (2023.01); *H04W 74/0833* (2013.01)

(58) Field of Classification Search
None
See application file for complete search history.

(56) References Cited

U.S. PATENT DOCUMENTS

| | | | |
|---|---|---|---|
| 2019/0313461 A1 | 10/2019 | Jung et al. | |
| 2021/0195675 A1* | 6/2021 | Park | H04W 88/14 |

OTHER PUBLICATIONS

Muruganathan, Siva, et al., "On the System-level Performance of Coordinated Multi-point Transmission Schemes in 5G NR Deployment Scenarios," 2019 IEEE 90th Vehicular Technology Conference (VTC2019-Fall), IEEE, pp. 1-5, (Sep. 22, 2019), available at: https://arxiv.org/ftp/arxiv/papers/1906/1906.07252.pdf, 5 pages.

(Continued)

*Primary Examiner* — Willie J Daniel, Jr.
(74) *Attorney, Agent, or Firm* — Schwabe, Williamson & Wyatt, P.C.

(57) ABSTRACT

Systems, apparatuses, methods, and computer-readable media, are provided for indicating beam failure detection (BFD) and/or beam failure recovery (BFR) information for secondary cells (SCells). Disclosed embodiments enable BFD/BFR reporting for SCells with only downlink or with both downlink and uplink to recover from link failure and/or beam failure. Other embodiments may be described and/or claimed.

15 Claims, 10 Drawing Sheets

(56) References Cited

OTHER PUBLICATIONS

Li, Yu-Ngok Ruyue, et al., "Beam Management in Millimeter-Wave Communications for 5G and Beyond," IEEE Access, Special Section on Millimeter-Wave Communications: New Research Trends and Challenges, vol. 8, 2020, Digital Object Identifier 10.1109/ACCESS.2019.2963514, Received Dec. 1, 2019, accepted Dec. 19, 2019, date of publication Jan. 1, 2020, date of current version Jan. 22, 2020, 12 pages.

Dahlman, Erik, et al., "5G NR the Next Generation Wireless Access Technology," Academic Press, ISBN: 978-0-12-814323-0, ISBN-10: 0128143231, Aug. 31, 2018, 469 pages.

Qualcomm Incorporated, "Summary of Remaining Details on RACH Procedure," 3GPP TSG-RAN WG1 92, R1-18xxxxx, Agenda item: 7.1.1.4.2, Apr. 16-20, 2018, Sanya, China, 16 pages.

3GPP, "Technical Specification Group Radio Access Network; NR; Medium Access Control (MAC) protocol specification (Release 15)," 3GPP TS 38.321 V15.6.0 (Jun. 2019), 5G, 78 pages.

3GPP, "Technical Specification Group Radio Access Network; NR; Multiplexing and channel coding (Release 15)," 3GPP TS 38.212 V15.6.0 (Jun. 2019), 5G, 101 pages.

3GPP, "Technical Specification Group Radio Access Network; Evolved Universal Terrestrial Radio Access (E-UTRA); Physical layer; Measurements (Release 15)," 3GPP TS 36.214 V15.3.0 (Sep. 2018), 5G, 25 pages.

3GPP, "Technical Specification Group Radio Access Network; NR; Physical layer measurements (Release 15)," 3GPP TS 38.215 V15.5.0 (Jun. 2019), 5G, 16 pages.

3GPP, "Technical Specification Group Radio Access Network; NR; Physical layer procedures for data (Release 15)," 3GPP TS 38.214 V15.6.0 (Jun. 2019), 5G, 105 pages.

3GPP, "Technical Specification Group Radio Access Network; NR; Physical layer procedures for control (Release 15)," 3GPP TS 38.213 V15.6.0 (Jun. 2019), 5G, 107 pages.

VIVO, "Discussion on the SCell BFR," 3GPP TSG-RAN WG2 Meeting #101bis, R2-1804696, Agenda Item: 10.3.1.4.2, Apr. 16-20, 2018, Sanya, China, 6 pages.

OPPO, "Issues on supporting SCell BFR RACH," 3GPP TSG-RAN2 #101 bis, R2-1804434, Agenda Item: 10.3.1.4.2, Apr. 16-20, 2018, Sanya, China, 3 pages.

Qualcomm Incorporated, "Summary of Remaining Details on RACH Procedure," 3GPP TSG-RAN WG1 93, R1-1807747, Agenda item: 7.1.1.4.2, May 21-25, 2018, Busan, Korea, 34 pages.

Mediatek Inc., "Summary on Remaining issues on Beam Failure Recovery," 3GPP TSG RAN WG1 Meeting #92, R1-1803362, Agenda Item: 7.1.2.2.4, Feb. 26-Mar. 2, 2018, Athens, Greece, 28 pages.

\* cited by examiner

BEAM FAILURE RECOVERY IN SECONDARY CELLS

RELATED APPLICATIONS

The present application claims priority to, and/or is a continuation of U.S. Provisional App. No. 62/888,372 titled "BEAM FAILURE RECOVERY IN SECONDARY CELLS" filed on Aug. 16, 2019 (AC4447-Z) and U.S. Provisional App. No. 62/890,524 titled "BEAM FAILURE RECOVERY IN SECONDARY CELLS" filed on Aug. 22, 2019 (AC4569-Z), the contents of each of which are hereby incorporated by reference in its entireties.

FIELD

Various embodiments of the present application generally relate to the field of wireless communications, and in particular to beam management in cellular communication networks.

BACKGROUND

Beam management refers to a set of L1/L2 procedures to acquire and maintain a set of transmission/reception point(s) (TRP or TRxP) and/or UE beams that can be used for downlink (DL) and uplink (UL) transmission/reception. Beam management includes various operations or procedures, such as beam determination, beam management, beam reporting, and beam sweeping operations/procedures. Current and previous 3GPP Fifth Generation (5G) standards/specification releases only support beam failure recovery (BFR) for a configured Primary Cell (PCell) or Primary SCG Cell (PSCell). Current 3GPP 5G/NR systems do not support BFR for Secondary Cells (SCells).

DETAILED DESCRIPTION

In the detailed description to follow, for ease of understanding, the present disclosure will be presented in the context of the Third Generation Partnership Project (3GPP) systems. However, the present disclosure is not limited to 3GPP compliant system only, and may be practiced in any communication system or network.

Beam management refers to a set of layer 1 (L1)/layer 2 (L2) procedures to acquire and maintain a set of transmission/reception point(s) (TRxP) and/or user equipment (UE) beams that can be used for downlink (DL) and uplink (UL) transmission (Tx) and reception (Rx). Beam management includes various operations or procedures, such as beam determination, beam management, beam reporting, and beam sweeping procedures. Beam determination refers to the ability to select of Tx/Rx beam(s). Beam measurement refers to the ability to measure characteristics of received beamformed signals. Beam reporting refers the UE's ability to report information of beamformed signal(s) based on beam measurements, such as beam failure reports, beam measurement reports, and the like. Beam sweeping refers to operation(s) of covering a spatial area, with beams transmitted and/or received during a time interval in a predetermined manner. Currently, 3GPP specifications only provide beam failure recovery (BFR) for a configured Primary Cell (PCell) or Primary SCG Cell (PSCell), and there is no mechanism to support BFR for Secondary Cells (SCells).

Disclosed embodiments include link recovery mechanisms for SCells including link recovery for DL SCells only and link recovery for both DL and UL SCells. In particular, embodiments herein include DL SCell only BFR mechanisms and DL and UL SCell BFR mechanisms. For the DL only SCell BFR, embodiments include mechanisms for conveying beam recovery information from a UE to Radio Access Network (RAN) node (e.g., next generation NodeB (gNB), etc.) along with mechanisms to recover the beam failure once this information is decoded by the RAN node. For DL and UL SCell BFR, embodiments include mechanisms for BFR utilizing an SCell UL. Other embodiments may be described and/or claimed.

Figure 1:
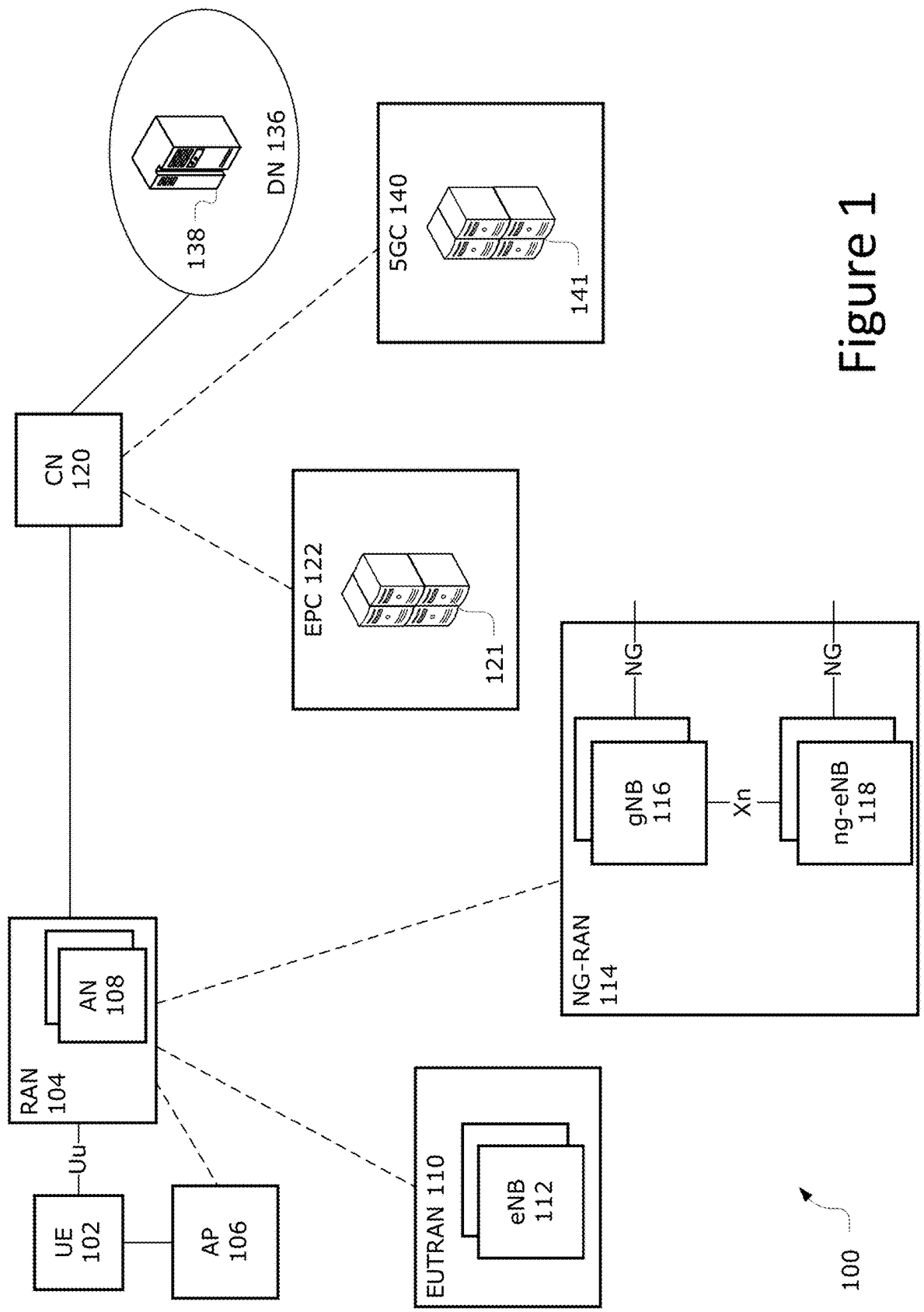
FIG. 1 illustrates an example network architecture according to various embodiments.

Referring now to FIG. 1, which illustrates a network 100 in accordance with various embodiments. The network 100 may operate in a manner consistent with 3GPP technical specifications for Long Term Evolution (LTE) or 5G/NR systems. However, the example embodiments are not limited in this regard and the described embodiments may apply to other networks that benefit from the principles described herein, such as future 3GPP systems, or the like.

The network 100 includes a UE 102, which is any mobile or non-mobile computing device designed to communicate with a RAN 104 via an over-the-air connection. The UE 102 is communicatively coupled with the RAN 104 by a Uu interface, which may be applicable to both LTE and NR systems. Examples of the UE 102 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 100 may include a plurality of UEs 102 coupled directly with one another via a D2D, ProSe, PC5, and/or sidelink (SL) interface. These UEs 102 may be M2M/D2D/MTC/IoT devices and/or vehicular systems that communicate using physical SL channels such as, but not limited to, Physical Sidelink Broadcast Channel (PSBCH), Physical Sidelink Discovery Channel (PSDCH), Physical Sidelink Shared Channel (PSSCH), Physical Sidelink Control Channel (PSCCH), Physical Sidelink Feedback Channel (PSFCH), etc.

In some embodiments, the UE 102 may additionally communicate with an AP 106 via an over-the-air (OTA) connection. The AP 106 manages a WLAN connection, which may serve to offload some/all network traffic from the RAN 104. The connection between the UE 102 and the AP 106 may be consistent with any IEEE 802.11 protocol. Additionally, the UE 102, RAN 104, and AP 106 may utilize cellular-WLAN aggregation/integration (e.g., LWA/LWIP). Cellular-WLAN aggregation may involve the UE 102 being configured by the RAN 104 to utilize both cellular radio resources and WLAN resources.

The RAN 104 includes one or more access network nodes (ANs) 108. The ANs 108 terminate air-interface(s) for the UE 102 by providing access stratum protocols including Radio Resource Control (RRC), Packet Data Convergence Protocol (PDCP), Radio Link Control (RLC), Medium Access Control (MAC), and physical (PHY/L1) layer protocols. In this manner, the AN 108 enables data/voice connectivity between CN 120 and the UE 102. The ANs 108 may be a macrocell base station or a low power base station for providing femtocells, picocells or other like cells having smaller coverage areas, smaller user capacity, or higher bandwidth compared to macrocells; or some combination thereof. In these implementations, an AN 108 be referred to as a BS, gNB, RAN node, eNB, ng-eNB, NodeB, RSU, TRxP, etc.

One example implementation is a "CU/DU split" architecture where the ANs 108 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v15.7.0 (Jan. 9, 2020)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 108 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 104 is an LTE RAN or Evolved Universal Terrestrial Radio Access Network (E-UTRAN) 110) or an Xn interface (if the RAN 104 is a NG-RAN 114). The X2/Xn interfaces, which may be separated into control/user plane interfaces in some embodiments, may allow the ANs to communicate information related to handovers, data/context transfers, mobility, load management, interference coordination, etc.

The ANs of the RAN 104 may each manage one or more cells, cell groups, component carriers, etc. to provide the UE 102 with an air interface for network access. The UE 102 may be simultaneously connected with a plurality of cells provided by the same or different ANs 108 of the RAN 104. For example, the UE 102 and RAN 104 may use carrier aggregation (CA) to allow the UE 102 to connect with a plurality of component carriers, each corresponding to a PCell or SCell. A PCell is an MCG cell, operating on a primary frequency, in which the UE 102 performs an initial connection establishment procedure and/or initiates a connection re-establishment procedure. An SCell is a cell providing additional radio resources on top of a Special Cell (SpCell) when the UE 102 is configured with CA. In CA, two or more Component Carriers (CCs) are aggregated. The UE 102 may simultaneously receive or transmit on one or multiple CCs depending on its capabilities. A UE 102 with single timing advance capability for CA can simultaneously receive and/or transmit on multiple CCs corresponding to multiple serving cells sharing the same timing advance (multiple serving cells grouped in one timing advance group (TAG)). A UE 102 with multiple timing advance capability for CA can simultaneously receive and/or transmit on multiple CCs corresponding to multiple serving cells with different timing advances (multiple serving cells grouped in multiple TAGs). The NG-RAN 114 ensures that each TAG contains at least one serving cell; A non-CA capable UE 102 can receive on a single CC and transmit on a single CC corresponding to one serving cell only (one serving cell in one TAG). CA is supported for both contiguous and non-contiguous CCs. When CA is deployed frame timing and SFN are aligned across cells that can be aggregated, or an offset in multiples of slots between the PCell/PSCell and an SCell is configured to the UE 102. In some implementations, the maximum number of configured CCs for a UE 102 is 16 for DL and 16 for UL.

In Dual Connectivity (DC) scenarios, a first AN 108 may be a master node that provides a Master Cell Group (MCG) and a second AN 108 may be secondary node that provides an Secondary Cell Group (SCG). The first and second ANs 108 may be any combination of eNB, gNB, ng-eNB, etc. The MCG is a subset of serving cells comprising the PCell and zero or more SCells. The SCG is a subset of serving cells comprising the PSCell and zero or more SCells. As alluded to previously, DC operation involves the use of PSCells and SpCells. A PSCell is an SCG cell in which the UE 102 performs random access (RA) when performing a reconfiguration with Sync procedure, and an SpCell for DC operation is a PCell of the MCG or the PSCell of the SCG; otherwise the term SpCell refers to the PCell. Additionally, the PCell, PSCells, SpCells, and the SCells can operate in the same frequency range (e.g., FR1 or FR2), or the PCell, PSCells, SpCells, and the SCells can operate in different frequency ranges. In one example, the PCell may operate in a sub-6 GHz frequency range/band and the SCell can operate at frequencies above 24.25 GHz (e.g., FR2).

The RAN 104 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In some embodiments, the RAN 104 may be an E-UTRAN 110 with one or more eNBs 112. The E-UTRAN 110 provides an LTE air interface (Uu) with the following characteristics: subcarrier spacing (SCS) of 15 kHz; cyclic prefix (CP)-OFDM waveform for DL and SC-FDMA waveform for UL; turbo codes for data and TBCC for control; etc. The LTE air interface may rely on channel state information reference signals (CSI-RS) for channel state information (CSI) acquisition and beam management; Physical Downlink Shared Channel (PDSCH)/Physical Downlink Control Channel (PDCCH) Demodulation Reference Signal (DMRS) for PDSCH/PDCCH demodulation; and cell-specific reference signals (CRS) for cell search and initial acquisition, channel quality measurements, and channel estimation for coherent demodulation/detection at the UE. The LTE air interface may operating on sub-6 GHz bands.

In some embodiments, the RAN 104 may be an next generation (NG)-RAN 114 with one or more gNB 116 and/or on or more ng-eNB 118. The gNB 116 connects with 5G-enabled UEs 102 using a 5G NR interface. The gNB 116 connects with a 5GC 140 through an NG interface, which includes an N2 interface or an N3 interface. The ng-eNB 118 also connects with the 5GC 140 through an NG interface, but may connect with a UE 102 via the Uu interface. The gNB 116 and the ng-eNB 118 may connect with each other over an Xn interface.

In some embodiments, the NG interface may be split into two parts, an NG user plane (NG-U) interface, which carries traffic data between the nodes of the NG-RAN 114 and a UPF (e.g., N3 interface), and an NG control plane (NG-C) interface, which is a signaling interface between the nodes of the NG-RAN 114 and an AMF (e.g., N2 interface).

The NG-RAN 114 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use Physical Broadcast Channel (PBCH) DMRS for PBCH demodulation; Phase Tracking Reference Signals (PTRS) for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an Synchronization Signal Block (SSB) that is an area of a DL resource grid that includes Primary Synchronization Signal (PSS)/Secondary Synchronization Signal (SS S)/PBCH.

The UE 102 can be configured to communicate using OFDM communication signals with other UEs 102 or with any of the AN 108 over a multicarrier communication channel in accordance with various communication techniques, such as, but not limited to, an OFDMA communication technique (e.g., for DL communications) or a SC-FDMA communication technique (e.g., for UL and SL communications), although the scope of the embodiments is not limited in this respect. The OFDM signals comprise a plurality of orthogonal subcarriers.

DL, UL, and SL transmissions are organized into frames with $T_f=(\Delta f_{max} N_f/100) \cdot T_c=10$ ms duration, each including ten subframes of $T_{sf}=(\Delta f_{max} N_f/1000) \cdot T_c=1$ ms duration. The number of consecutive OFDM symbols per subframe is $N_{symb}^{subframe,\mu}=N_{symb}^{slot} N_{slot}^{subframe,\mu}$ where $N_{symb}^{subframe,\mu}$ is the number of OFDM symbols per subframe for subcarrier spacing configuration μ (see e.g., clause 4.3.1 in 3GPP TS 38.211 v15.6.0 (Jun. 24, 2019) (hereinafter "[TS38211]"), $N_{symb}^{slot}$ is the number of symbols per slot, and $N_{slot}^{subframe,\mu}$ is the number of slots per subframe for subcarrier spacing configuration μ (see e.g., clause 4.3.2 in [TS38211]). Each frame is divided into two equally-sized half-frames of five subframes each with half-frame 0 consisting of subframes 0-4 and half-frame 1 consisting of subframes 5-9. There is one set of frames in the uplink and one set of frames in the downlink on a carrier. Uplink frame number i for transmission from the UE shall start $T_{TA}=(N_{TA}+N_{TA,offset}) T_c$ before the start of the corresponding downlink frame at the UE where $N^{TA,offset}$ is given by 3GPP TS 38.213 v15.6.0 (Jun. 24, 2019) (hereinafter "[TS38213]"), except for msgA transmission on the Physical Uplink Control Channel (PUSCH) where $N_{TA}=0$ is used.

There is one resource grid (also referred to as a time-frequency grid or the like) for a given antenna port p, subcarrier spacing (SCS) configuration μ, and transmission direction (e.g., DL, UL, or SL). For each numerology and carrier, a resource grid of $N_{grid,x}^{size,\mu} N_{sc}^{RB}$ subcarriers and $N_{symb}^{subframe,\mu}$ OFDM symbols is defined, starting at common resource block (RB) $N_{grid}^{start,\mu}$ indicated by higher-layer signalling. An RB is defined as $N_{sc}^{RB}=12$ consecutive subcarriers in the frequency domain.

Each element in the resource grid for antenna port p and SCS configuration μ is called a resource element (RE) and is uniquely identified by $(k, l)_{p,\mu}$ where k is the index in the frequency domain and l refers to the symbol position in the time domain relative to some reference point. RE $(k, l)_{p,\mu}$ corresponds to a physical resource and the complex value $a_{k,l}^{(p,\mu)}$. When no particular antenna port or SCS is specified, the indices p and μ may be dropped, resulting in $a_{k,l}^{(p)}$ or $a_{k,l}$. Each resource grid comprises a number of RBs, which describe the mapping of certain physical channels to REs. Additionally, each RB comprises a collection of REs. An RE represents the smallest time-frequency unit in a resource grid.

Physical resource blocks (PRBs) for SCS configuration μ are defined within a bandwidth part (BWP) and numbered from 0 to $N_{BWP,i}^{size,\mu}-1$ where i is the number of the BWP. The relation between the physical resource block $n_{PRB}^{\mu}$ in BWP i and the common resource block $n_{CRB}^{\mu}$ is given by $n_{CRB}^{\mu}=n_{PRB}^{\mu}+N_{BWP,i}^{start,\mu}$ where $N_{BWP,i}^{start,\mu}$ is the common resource block where BWP i starts relative to common resource block 0. Virtual resource blocks (VRBs) are defined within a BWP and numbered from 0 to $N_{BWP,i}^{size}-1$ where i is the number of the BWP.

An antenna port is defined such that a channel over which a symbol on the antenna port is conveyed can be inferred from the channel over which another symbol on the same antenna port is conveyed. For DMRS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG (see e.g., clause 5.1.2.3 of 3GPP TS 38.214 v15.6.0 (Jun. 24, 2019) (hereinafter "[TS38214]"). For DMRS associated with a PDCCH, the channel over which a PDCCH symbol on one antenna port is conveyed can be inferred from the channel over which a DMRS symbol on the same antenna port is conveyed only if the two symbols are within resources for which the UE may assume the same precoding being used (see e.g., clause 7.3.2.2 of [TS38211]). For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index (see e.g., clause 7.4.3.1 of [TS38211]). Two antenna ports are said to be quasi co-located (QCL'd) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The DL transmission scheme includes, inter alia, a closed loop DMRS based spatial multiplexing is supported for PDSCH. In some implementations, up to 8 and 12 orthogonal DL DMRS ports are supported for type 1 and type 2 DMRS respectively. In some implementations, up to 8 orthogonal DL DMRS ports per UE 102 are supported for single user (SU)-multiple input multiple output (MIMO) and up to 4 orthogonal DL DMRS ports per UE are supported for multi-user (MU)-MIMO. The number of SU-MIMO code words is one for 1-4 layer transmissions and two for 5-8 layer transmissions. The DMRS and corresponding PDSCH are transmitted using the same precoding matrix and the UE 102 does not need to know the precoding matrix to demodulate the transmission. The transmitter may use different precoder matrix for different parts of the transmission bandwidth, resulting in frequency selective precoding. The UE 102 may also assume that the same precoding matrix is used across a set of PRBs, which is denoted as a Precoding Resource Block Group (PRG). Transmission durations from 2 to 14 symbols in a slot is supported, and aggregation of multiple slots with Transport Block (TB) repetition is supported.

Data and control streams from/to the MAC layer are encoded/decoded to offer transport and control services over the radio transmission link. A channel coding scheme is a combination of error detection, error correcting, rate matching, interleaving and transport channel or control information mapping onto/splitting from physical channels.

The PHY layer processing for the PDSCH and/or PHY layer processing of transport channels includes the following steps: transport block CRC attachment; code block segmentation and code block CRC attachment; channel coding (e.g., LDPC coding); PHY layer HARQ processing; rate matching; scrambling; modulation (e.g., QPSK, 16 QAM, 64 QAM and 256 QAM); layer mapping; and mapping to assigned resources and antenna ports. The UE 102 may assume that at least one symbol with demodulation reference signal is present on each layer in which PDSCH is transmitted to the UE 102, and up to 3 additional DMRS can be configured by higher layers. Rate matching means that bits on a transport channel (TrCH) are repeated or punctured. Higher layers assign a rate-matching attribute for each TrCH. This attribute is semi-static and can only be changed through higher layer signalling. The rate-matching attribute is used when the number of bits to be repeated or punctured is calculated. Various aspects of rate matching are discussed in 3GPP TS 25.213 v15.0.0 (Sep. 25, 2017) and 3GPP TS 38.212 v15.6.0 (Jun. 24, 2019).

Additionally, the PDCCH can be used to schedule DL transmissions on PDSCH and UL transmissions on PUSCH, where the Downlink Control Information (DCI) on PDCCH includes: DL assignments containing at least modulation and coding format, resource allocation, and HARQ information related to DL shared channel (DL-SCH), and UL scheduling grants containing at least modulation and coding format, resource allocation, and HARQ information related to UL shared channel (UL-SCH). The UE 102 monitors a set of PDCCH candidates in configured monitoring occasions in one or more configured Control Resource Sets (CORESETs) according to corresponding search space configurations. A CORESET includes a set of PRBs with a time duration of 1 to 3 OFDM symbols. The resource units Resource Element Groups (REGs) and Control Channel Elements (CCEs) are defined within a CORESET with each CCE comprising a set of REGs. Control channels are formed by aggregation of CCE(s). Different code rates for the control channels are realized by aggregating different number of CCEs. Interleaved and non-interleaved CCE-to-REG mapping are supported in a CORESET. Polar coding and QPSK modulation is used for PDCCH. Each REG carrying PDCCH carries its own DMRS.

The 5G-NR air interface may utilize BWPs for various purposes. For example, BWP can be used for dynamic adaptation of the SCS. For example, the UE 102 can be configured with multiple BWPs where each BWP configuration has a different SCS. When a BWP change is indicated to the UE 102, the SCS of the transmission is changed as well. Another use case example of BWP is related to power saving. In particular, multiple BWPs can be configured for the UE 102 with different amount of frequency resources (e.g., PRBs) to support data transmission under different traffic loading scenarios. A BWP containing a smaller number of PRBs can be used for data transmission with small traffic load while allowing power saving at the UE 102 and in some cases at the gNB 116. A BWP containing a larger number of PRBs can be used for scenarios with higher traffic load.

A BWP is a subset of contiguous common resource blocks defined in clause 4.4.4.3 of [TS38211] or a given numerology $\mu_i$ in BWP i on a given carrier. The starting position $N_{BWP,i}^{start,\mu}$ and the number of RBS $N_{BWP,i}^{size,\mu}$ in a BWP fulfils $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{size,\mu} \leq N_{grid,x}^{start,\mu} + N_{grid,x}^{size,\mu}$, respectively. Configuration of a BWP is described in clause 12 of [TS38213]. The UE 102 can be configured with up to four BWPs in the downlink with a single downlink BWP being active at a given time. The UE is not expected to receive PDSCH, PDCCH, or CSI-RS (except for RRM) outside an active BWP. The UE 102 can be configured with up to four BWPs in the uplink with a single uplink BWP being active at a given time. If the UE 102 is configured with a supplementary uplink, the UE 102 can in addition be configured with up to four BWPs in the supplementary uplink with a single supplementary uplink BWP being active at a given time. The UE 102 does not transmit PUSCH or PUCCH outside an active BWP. For an active cell, UE 102 does not transmit SRS outside an active BWP.

The RAN 104 is communicatively coupled to CN 120, which includes network elements and/or network functions (NFs) to provide various functions to support data and telecommunications services to customers/subscribers (e.g., UE 102). The network elements and/or NFs may be implemented by one or more servers 121, 141. The components of the CN 120 may be implemented in one physical node or separate physical nodes. In some embodiments, NFV may be utilized to virtualize any or all of the functions provided by the network elements of the CN 120 onto physical compute/storage resources in servers, switches, etc. A logical instantiation of the CN 120 may be referred to as a network slice, and a logical instantiation of a portion of the CN 120 may be referred to as a network sub-slice.

The CN 120 may be an LTE CN 122 (also referred to as an Evolved Packet Core (EPC) 122). The EPC 122 may include MME, SGW, SGSN, HSS, PGW, PCRF, and/or other NFs coupled with one another over various interfaces (or "reference points") (not shown). The CN 120 may be a 5GC 140 including an AUSF, AMF, SMF, UPF, NSSF, NEF, NRF, PCF, UDM, AF, and/or other NFs coupled with one another over various service-based interfaces and/or reference points. The 5GC 140 may enable edge computing by selecting operator/3rd party services to be geographically close to a point that the UE 102 is attached to the network. This may reduce latency and load on the network. In edge computing implementations, the 5GC 140 may select a UPF close to the UE 102 and execute traffic steering from the UPF to DN 136 via the N6 interface. This may be based on the UE subscription data, UE location, and information provided by the AF, which allows the AF to influence UPF (re)selection and traffic routing.

The data network (DN) 136 may represent various network operator services, Internet access, or third party services that may be provided by one or more servers including, for example, application (app)/content server 138. The DN 136 may be an operator external public, a private PDN, or an intra-operator packet data network, for example, for provision of IMS services. In this embodiment, the server 138 can be coupled to an IMS via an S-CSCF or the I-CSCF. In some implementations, the DN 136 may represent one or more local area DNs (LADNs), which are DNs 136 (or DN names (DNNs)) that is/are accessible by a UE 102 in one or more specific areas. Outside of these specific areas, the UE 102 is not able to access the LADN/DN 136.

Additionally or alternatively, the DN 136 may be an Edge DN 136, which is a (local) Data Network that supports the architecture for enabling edge applications. In these embodiments, the app server 138 may represent the physical hardware systems/devices providing app server functionality and/or the application software resident in the cloud or at an edge compute node that performs server function(s). In some embodiments, the app/content server 138 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 110, 114. For example, the edge compute nodes can provide a connection between the RAN 114 and UPF in the 5GC 140. The edge compute nodes can use one or more NFV instances instantiated on virtualization infrastructure within the edge compute nodes to process wireless connections to and from the RAN 114 and a UPF.

In some implementations, the system 100 may include an SMSF, which is responsible for SMS subscription checking and verification, and relaying SM messages to/from the UE 102 to/from other entities, such as an SMS-GMSC/IWMSC/SMS-router. The SMS may also interact with AMF and UDM for a notification procedure that the UE 102 is available for SMS transfer (e.g., set a UE not reachable flag, and notifying UDM when UE 102 is available for SMS).

1. Beam Failure Detection and Beam Failure Recovery Embodiments

As alluded to previously, the UE 102 may be configured for beam management, where the UE 102 measures one or more beams of a cell and the measurement results (e.g., power values) are averaged to derive cell quality. In doing so, the UE 102 is configured to consider a subset of the detected beams, such as the X best beams above an absolute threshold (where X is a number). Filtering takes place at two different levels: at the PHY layer to derive beam quality and then at the RRC level to derive cell quality from multiple beams. Cell quality from beam measurements is derived in the same way for the serving cell(s) and for the non-serving cell(s). Measurement reports may contain the measurement results of the X best beams if the UE 102 is configured to do so by the gNB 116 (where X is a number).

The UE 102 derives cell measurement results by measuring one or multiple beams per cell as configured by the network. For all cell measurement results, the UE 102 applies layer 3 (L3) filtering before using the measured results for evaluation of reporting criteria and measurement reporting. For cell measurements, the network can configure Reference Signal Received Power (RSRP), Reference Signal Received Quality (RSRQ), and/or Signal-to-Interference plus Noise Ratio (SINR) as a trigger quantity. Reporting quantities can be the same as the trigger quantity or combinations of quantities (e.g., RSRP and RSRQ; RSRP and SINR; RSRQ and SINR; RSRP, RSRQ and SINR). In other embodiments, other measurements and/or combinations of measurements may be used as a trigger quantity such as those discussed in 3GPP TS 36.214 v15.3.0 (Sep. 27, 2018) (hereinafter "[TS36214]"), 3GPP TS 38.215 v15.5.0 (Jun. 24, 2019) (hereinafter "[TS38215]"), Institute of Electrical and Electronics Engineers (IEEE) Standards Association, "IEEE Computer Society: "Part 11: Wireless LAN Medium Access Control (MAC) and Physical Layer (PHY) Specifications", IEEE Std 802.11™-2012 (2012) (hereinafter "[IEEE80211]"), and/or the like.

The network may also configure the UE 102 to report measurement information per beam, which can either be measurement results per beam with respective beam identifier(s) or only beam identifier(s)). If beam measurement information is configured to be included in measurement reports, the UE 102 applies the L3 beam filtering. However, the exact L1 filtering of beam measurements used to derive cell measurement results is implementation dependent. For channel state estimation purposes, the UE 102 may be configured to measure CSI-RS resources and estimate a downlink channel state based on the CSI-RS measurements. The UE 102 feeds the estimated channel state back to the AN 108 (e.g., gNB 116) to be used in link adaptation.

For beam failure detection (BFD), the AN 108 (e.g., gNB 116) configures the UE 102 with BFD reference signals and the UE 102 declares a beam failure when a number of beam failure instance indications from the PHY layer reaches a configured threshold before a configured timer expires. In particular, a beam failure is detected by counting the number beam failure instance indications from the lower layers to the MAC entity in the UE 102. Each time instant a measured beam is below a configured value is defined as a beam failure instance. If the number of consecutive beam failure instances exceeds a configured value, the device declares a beam failure and initiates the beam-failure-recovery procedure. The BFD reference signals may be SSB or CSI-RS. SSB-based BFD is based on the SSB associated with the initial DL BWP and can only be configured for the initial DL BWPs and for DL BWPs containing the SSB associated to the initial DL BWP. For other DL BWPs, BFD can only be performed based on CSI-RS.

A beam failure is assumed to have happened when the error probability for the PDCCH exceeds a certain value. However, similar to radio link failure (RLFs), rather than actually measuring the PDCCH error probability, the UE 102 declares a beam failure based on quality measurements of the configured BFD reference signals (RSs). In particular, the UE 102 may declare a beam failure based on measured L1-RSRP of a periodic CSI-RS or SSB that is spatially QCL'd with the PDCCH. In some implementations, the UE 102 may declare beam failure based on measurement on the BFD RSs (e.g., CSI-RS or SSB) associated with the PDCCH Transmission Configuration Indicator (TCI) state. In other implementations, the UE 102 may be explicitly configured to measure a different CSI-RS or SSB for BFD.

After beam failure is detected, the UE 102 triggers beam failure recovery by initiating a RA procedure on the PCell, and selecting a suitable beam to perform beam failure recovery (e.g., if the gNB 116 has provided dedicated RA resources for certain beams, those will be prioritized by the UE 102). Upon completion of the RA procedure, beam failure recovery is considered complete.

More specifically, the UE 102 can be provided, for each BWP of a serving cell, a set $\bar{q}_0$ of periodic CSI-RS resource configuration indexes by failureDetectionResources and a set $\bar{q}_1$ of periodic CSI-RS resource configuration indexes and/or SS/PBCH block (SSB) indexes by candidate-BeamRSList, candidateBeamRSListExt-r16, or candidate-BeamRSSCellList-r16 for radio link quality measurements on the BWP of the serving cell. For example, the parameter candidateBeamRSList includes a list of reference signals (e.g., CSI-RS and/or SSB) identifying the candidate beams for recovery and the associated RA parameters. If the UE 102 is not provided $\bar{q}_0$ by failureDetectionResources or beamFailureDetectionResourceList for a BWP of the serving cell, the UE 102 determines the set $\bar{q}_0$ to include periodic CSI-RS resource configuration indexes with same values as the RS indexes in the RS sets indicated by TCI-State for respective Control Resource Sets (CORESETs) that the UE 102 uses for monitoring PDCCH, and if there are two RS indexes in a TCI state, the set $\bar{q}_0$ includes RS indexes with QCL-TypeD configuration for the corresponding TCI states. The UE 102 expects the set $\bar{q}_0$ to include up to two RS indexes. The UE 102 expects single port RS in the set $\bar{q}_0$. The UE 102 expects single-port or two-port CSI-RS with frequency density equal to 1 or 3 resource elements (REs) per resource block (RB) in the set $\bar{q}_1$.

The thresholds $Q_{out,LR}$ and $Q_{in,LR}$ correspond to the default value of rlmInSyncOutOfSyncThreshold, as described in 3GPP TS 38.133 v15.6.0 (Jul. 4, 2019) (hereinafter "[TS38133]") for $Q_{out}$, and to the value provided by rsrp-ThresholdSSB or rsrp-ThresholdBFR-r16, respectively.

RRC configures the parameter rsrp-ThresholdSSB, among many others, for an RA procedure. The parameter rsrp-ThresholdSSB is an RSRP threshold for the selection of the SSB for a 4-step RA type procedure. If the RA procedure is initiated for beam failure recovery, rsrp-ThresholdSSB used for the selection of the SSB within candidate-BeamRSList refers to rsrp-ThresholdSSB in BeamFailureRecoveryConfig information element (IE). Other RRC configured RA parameters are discussed at section 5.1 of [TS38321].

The PHY layer in the UE 102 assesses the radio link quality according to the set $\bar{q}_0$ of resource configurations against the threshold $Q_{out,LR}$. For the set $\bar{q}_0$, the UE 102 assesses the radio link quality only according to periodic CSI-RS resource configurations, or SS/PBCH blocks on the PCell or the PSCell, that are QCL'd, as described in [TS38214], with the DM-RS of PDCCH receptions monitored by the UE. The UE 102 applies the $Q_{in,LR}$ threshold to the L1-RSRP measurement obtained from a SS/PBCH block. The UE 102 applies the $Q_{in,LR}$ threshold to the L1-RSRP measurement obtained for a CSI-RS resource after scaling a respective CSI-RS reception power with a value provided by powerControlOffsetSS.

In non-DRX mode operation, the PHY layer in the UE 102 provides an indication to higher layers when the radio link quality for all corresponding resource configurations in the set $\bar{q}_0$ that the UE 102 uses to assess the radio link quality is worse than the threshold $Q_{out,LR}$. The physical layer informs the higher layers when the radio link quality is worse than the threshold $Q_{out,LR}$ with a periodicity determined by the maximum between the shortest periodicity among the periodic CSI-RS configurations, and/or SS/PBCH blocks on the PCell or the PSCell, in the set $\bar{q}_0$ that the UE 102 uses to assess the radio link quality and 2 msec. In DRX mode operation, the physical layer provides an indication to higher layers when the radio link quality is worse than the threshold $Q_{out,LR}$ with a periodicity determined as described in [TS38133].

For the PCell or the PSCell, upon request from higher layers, the UE 102 provides to higher layers the periodic CSI-RS configuration indexes and/or SS/PBCH block indexes from the set $\bar{q}_1$ and the corresponding L1-RSRP measurements that are larger than or equal to the $Q_{in,LR}$ threshold.

For the SCell, upon request from higher layers, the UE 102 indicates to higher layers whether there is at least one periodic CSI-RS configuration index and/or SSB index from the set $\bar{q}_1$ with corresponding L1-RSRP measurements that are larger than or equal to the $Q_{in,LR}$ threshold, and provides the periodic CSI-RS configuration indexes and/or SSB indexes from the set $\bar{q}_1$ and the corresponding L1-RSRP measurements that are larger than or equal to the $Q_{in,LR}$ threshold, if any. The SSB Index identifies an SSB within a Synchronization Signal (SS) Burst (see e.g., clause 4.1 of [TS38213]).

For the PCell or the PSCell, a UE 102 can be provided a CORESET through a link to a search space set provided by recoverySearchSpaceId, as described in Clause 10.1, for monitoring PDCCH in the CORESET. If the UE 102 is provided recoverySearchSpaceId, the UE 102 does not expect to be provided another search space set for monitoring PDCCH in the CORESET associated with the search space set provided by recoverySearchSpaceId.

For the PCell or the PSCell, the UE 102 can be provided, by PRACH-ResourceDedicatedBFR, a configuration for Physical Random Access Channel (PRACH) transmission as described in clause 8.1 of [TS38213]. For PRACH transmission in slot n and according to antenna port quasi co-location (QCL) parameters associated with periodic CSI-RS resource configuration or with SS/PBCH block associated with index $\bar{q}_{new}$ provided by higher layers 3GPP TS 38.321 v15.6.0 (Jun. 29, 2019) (hereinafter "[TS38321]"), the UE 102 monitors PDCCH in a search space set provided by recoverySearchSpaceId for detection of a DCI format with CRC scrambled by C-RNTI or MCS-C-RNTI starting from slot n+4 within a window configured by BeamFailureRecoveryConfig. For PDCCH monitoring in a search space set provided by recoverySearchSpaceId and for corresponding PDSCH reception, the UE 102 assumes the same antenna port quasi-collocation parameters as the ones associated with index $\bar{q}_{new}$ until the UE 102 receives by higher layers an activation for a TCI state or any of the parameters tci-StatesPDCCH-ToAddList and/or tci-StatesPDCCH-ToReleaseList. After the UE 102 detects a DCI format with CRC scrambled by C-RNTI or MCS-C-RNTI in the search space set provided by recoverySearchSpaceId, the UE 102 continues to monitor PDCCH candidates in the search space set provided by recoverySearchSpaceId until the UE 102 receives a MAC CE activation command for a TCI state or tci-StatesPDCCH-ToAddList and/or tci-StatesPDCCH-ToReleaseList.

For the PCell or the PSCell, after 28 symbols from a last symbol of a first PDCCH reception in a search space set provided by recoverySearchSpaceId for which the UE 102 detects a DCI format with CRC scrambled by C-RNTI or MCS-C-RNTI and until the UE 102 receives an activation command for PUCCH-SpatialRelationInfo [TS38321] or is provided PUCCH-SpatialRelationInfo for PUCCH resource(s), the UE 102 transmits a PUCCH on a same cell as the PRACH transmission using a same spatial filter as for the last PRACH transmission and/or a power determined as described in Clause 7.2.1 of [TS38213] with $\bar{q}_u=0$, $\bar{q}_d=\bar{q}_{new}$, and l=0.

For the PCell or the PSCell, after 28 symbols from a last symbol of a first PDCCH reception in a search space set provided by recoverySearchSpaceId where a UE 102 detects a DCI format with CRC scrambled by C-RNTI or MCS-C-RNTI, the UE 102 assumes same antenna port quasi-collocation parameters as the ones associated with index $\bar{q}_{new}$ for PDCCH monitoring in a CORESET with index 0.

The UE 102 can be provided, by schedulingRequestID-BFR-SCell-r16, a configuration for PUCCH transmission with a link recovery request (LRR) as described in clause 9.2.4 of [TS38213]. In particular, the UE 102 can be configured by schedulingRequestIDForBFR a configuration for LRR in a PUCCH transmission using either PUCCH format 0 or PUCCH format 1. The UE 102 may also be configured with a PUCCH resource by schedulingRequest-IDForBFR, providing a PUCCH format 0 resource or a PUCCH format 1 resource as described in clause 9.2.1 of [TS38213]. The UE 102 is also configured with a periodicity $SR_{PERIODICITY}$ in symbols or slots and an offset $SR_{OFFSET}$ in slots by periodicityAndOffset for a PUCCH transmission conveying SR. If $SR_{PERIODICITY}$ is larger than one slot, the UE determines a SR transmission occasion in a PUCCH to be in a slot with number $n_{s,f}^{\mu}$ (see e.g., [TS38211]) in a frame with number $n_f$ if $(n_f N_{slot}^{frame,\mu}+n_{s,f}^{\mu}-SR_{OFFSET})$ mod$SR_{PERIODICITY}=0$. If $SR_{PERIODICITY}$ is one slot, the UE 102 expects that $SR_{OFFSET}=0$ and every slot is a SR transmission occasion in a PUCCH. If $SR_{PERIODICITY}$ is smaller than one slot, the UE 102 determines an SR transmission occasion in a PUCCH to start in a symbol with index l (see e.g., [TS38211]) if $(l-l_0$ mod $SR_{PERIODICITY})$ mod $SR_{PERIODICITY}=0$ where $l_0$ is the value of startingSymbolIndex.

In various embodiments, the UE 102 can transmit in a first PUSCH MAC Control Element (CE) providing index(es) for at least corresponding SCell(s) with radio link quality worse than $Q_{out,LR}$, indication(s) of presence of $q_{new}$ for corresponding SCell(s), and index(es) $q_{new}$ for a periodic CSI-RS configuration or for a SSB provided by higher layers, as described in [TS38321], if any, for corresponding SCell(s).

After 28 symbols from a last symbol of a PDCCH reception with a DCI format scheduling a PUSCH transmission with a same Hybrid Automatic Repeat Request (HARD) process number as for the transmission of the first PUSCH and having a toggled NDI field value, the UE 102 monitors PDCCH in all CORESETs on the SCell(s) indicated by the MAC CE using the same antenna port QCL parameters as the ones associated with the corresponding index(es) $q_{new}$, if any. Then, the UE 102 transmits PUCCH on a PUCCH-SCell using a same spatial domain filter as the one corresponding to $q_{new}$ for periodic CSI-RS or SS/PBCH block reception, as described in clause 9.2.2 of [TS38213], and using a power determined as described in clause 7.2.1 of [TS38213] with $q_u=0$, $q_d=q_{new}$, and l=0, if the UE 102 is provided PUCCH-SpatialRelationInfo for the PUCCH, a PUCCH with the LRR was either not transmitted or was transmitted on the PCell or the PSCell, and the PUCCH-SCell is included in the SCell(s) indicated by the MAC CE. The SCS configuration for the 28 symbols is the smallest of the SCS configurations of the active DL BWP for the PDCCH reception and of the active DL BWP(s) of the at least one SCell.

1.1. Beam Failure Detection and Association with Beam Failure Events

As alluded to previously NR release (Rel)-16, the BFR procedure for an SCell, at a high level, involves BFD where the UE 102 monitors transmitted BFD RSs to determine whether the beam on which it is Tx/Rx is working properly (e.g., "BFR procedure Step 1"). If the monitored BFD RSs fall below a certain measurement threshold (e.g., an RSRP threshold), the UE 102 declares a beam failure instance/event and triggers a BFR procedure, which involves the UE 102 transmitting a BFR request (BFRQ) to a serving AN 108 and identifying new beams on which it can continue Tx/Rx (e.g., "BFR procedure Step 2").

A first part of the BFRQ process involves indicating to the AN 108 that a beam failure has happened using a BFRQ, and then the second part of the BFRQ process involves indicating to the AN 108 what new beam is actually viable (or what the UE 102 has identified as an alternate beam by measuring over some resources). During a BFRQ procedure, the UE 102 reports only one beam using a corresponding beam index per SCell. The BFRQ for an SCell is usually carried by at least a dedicated Scheduling Request (SR) is-like PUCCH resource for BFR over a corresponding PCell or PSCell. The rationale is that the BFRQ will be transmitted over a non-failed cell since the UE 102 always has an active PCell for an SCell. The understanding is that the UE 102 can leverage the PCell to let the AN 108 know over the SR-like PUCCH resource that a beam failure event has happened. The AN 108 schedules a UL grant in response to receipt of the SR-like PUCCH transmission (BFRQ), and the UE 102 transmits a MAC CE in that UL grant. The MAC CE transmitted by the UE 102 contains information related to the recovery of the beam.

The BFD RSs (also referred to as "BFR RSs") can be configured in an explicit manner or an implicit manner. When an SCell BFD RS is configured in an implicit manner, the BFD RS can be transmitted in an active BWP of either a current component carrier (CC) or another CC. The UE 102 can be configured to perform BFR for any configured SCells. The maximum number of SCells for which the UE 102 performs BFR is based on UE 102 capability. The SCell BFR procedure embodiments are based upon the foregoing.

In one embodiment, BFD is performed by the UE 102 on a per-SCell basis and a beam failure event is declared by the UE 102 when all BFD RSs configured to an SCell have failed. In this embodiment, there may be multiple configured BFD RSs that the UE 102 is tracking. The UE 102 performs BFD for each cell that is configured. and the criteria of defining a beam failure event (and subsequently transmitting a BFRQ) is when all of the BFD RSs have failed.

In another embodiment, BFD is not performed on a per-SCell basis. Rather, BFD is performed by the UE 102 for a group of SCells (or a subset of all configured SCells), and beam failure is declared when all BFD RSs for the group of SCells have failed. In another embodiment, BFD can be declared when a subset of BFD RSs corresponding to a group of SCells has failed. In this embodiment, instead of requiring all BFD RSs to be declared as failed to send a BFRQ, the UE 102 may send a BFRQ when only a subset of the BFD RSs has been determined to have failed. The subset of BFD RSs to be monitored (or the number of BFD RSs that should be determined to have failed before sending a BFRQ) may be based on UE 102 implementation. Additionally or alternatively, a group of SCells and/or a BFD RS subset is considered failed if all BFD RS associated with these SCell group or BFD RS subset has a Block Error Ratio (BLER) above threshold. Other measurements may be used in other embodiments.

In any of the aforementioned embodiments, the SCell groups and/or the BFD RS subsets can be defined based on any suitable criteria. In one example, the SCell groups and/or BFD RS subsets may be based on secondary PUCCH groups whose corresponding UL control information (UCI) are transmitted on the PUCCH of a secondary carrier (sometimes referred to as a PUCCH secondary carrier). In another example, the SCells and/or BFD RSs may be grouped (or placed in a subset) according to SCells that are in the same band. In another example, the SCell groups and/or BFD RS subsets may based on SCells or BFD RSs belonging to a same Timing Advance Group (TAG). In another example, the SCell groups and/or BFD RS subsets may be configured via RRC signaling. The SCell groups may be formed according to some other criteria/parameters in other embodiments.

1.2. BFR for Scell with DL Only

BFR for SCells with DL only involves cases where an SCell does not have any UL transmissions, which means that some other non-failed cell should be used for BFR, such as the PCell or PSCell. In embodiments where a beam failure event occurs when all beams in an SCell are below a measurement threshold (e.g., RSRP threshold or the like), a BFRQ is sent from the UE 102 to the gNB 116. The BRRQ is the first indication that BFR is required. The BFRQ may be sent over a PUCCH similar to SR to request a UL resource allocation for providing New Beam Information (NBI) to the gNB 116. The UE 102 receives the UL resource allocation from the gNB 116, and transmits NBI to the gNB 116 over the UL resource allocation. In various embodiments, the NBI includes CC index(es) of the failed beam(s), along with an identifier (ID) or index of candidate BFD RSs (e.g., SSBs) that is/are above a predetermined or configured measurement threshold (e.g., an RSRP threshold indicated by the parameter rsrp-ThresholdSSB or rsrp-ThresholdBFR-r16). In one embodiment, the NBI can be provided in the form of an SSB Resource Indicator (SSBRI) or a Channel State Information Resource Indicator (CRI) as part of the MAC CE transmission over the PCell.

Alternatively, the SCell identity (ID) group corresponding to the failed beam/CC is reported to reduce signalling overhead at the MAC layer. The grouping of the SCells can be explicit or implicit based on other parameters (e.g., supported band) and/or any other criteria/parameters, such as those discussed previously. In another example, the SCell ID group is indicated implicitly by the PUCCH resource used for the BFRQ, and the MAC CE may indicate the CC index of the failed CC of the corresponding SCell group. In these ways, the MAC CE transmitted by the UE does not need to contain the CC index for every failed CC/beam, but instead includes an ID corresponding to an SCell group, which should reduce the size of the MAC CE and the amount of signaling taking place over the air interface.

In one embodiment, another operation in the BFR process (e.g., "BFR procedure step 3") is defined for concluding BFR. In this embodiment, explicit configuration is used wherein the gNB 116 can leverage the PCell to send another MAC CE to activate a TCI state corresponding to the NBI, and the link recovery is complete when UE 102 receives a PDCCH that is QCL'd with the NBI conveyed in step 2 of the BFR procedure. Once the gNB 116 receives the NBI, the gNB 116 can then explicitly configure the UE 102 to use that particular beam. At this point, the UE 102 will conclude that the BFR has concluded.

In another embodiment, implicit signalling is used where a CORESET-BFR can be used. In this embodiment, the UE 102 may start monitoring the CORESET associated with a recoverySearchSpaceId from BeamFailureRecoveryConfig with the assumption that PDCCH transmission will be QCL'd with the NBI, and link recovery is complete when the UE 102 receives a PDCCH or PDSCH transmission on the BFR CORESET.

1.3. BFR for Scell with DL and UL

BFR for SCells with DL and UL involves cases where UL and DL transmission may be conveyed over an SCell. In one embodiment, the PCell procedure for SCell with only DL is simply replicated for SCells with both DL and UL. This embodiment is based on the assumption that the Pcell or PSCell service is still active. One drawback to this embodiment is that PCell or PSCell resources are used for BFR. In another embodiment, (pre)configured PRACH resources on the SCell UL can be used for an NBI on the SCell.

Figure 2:
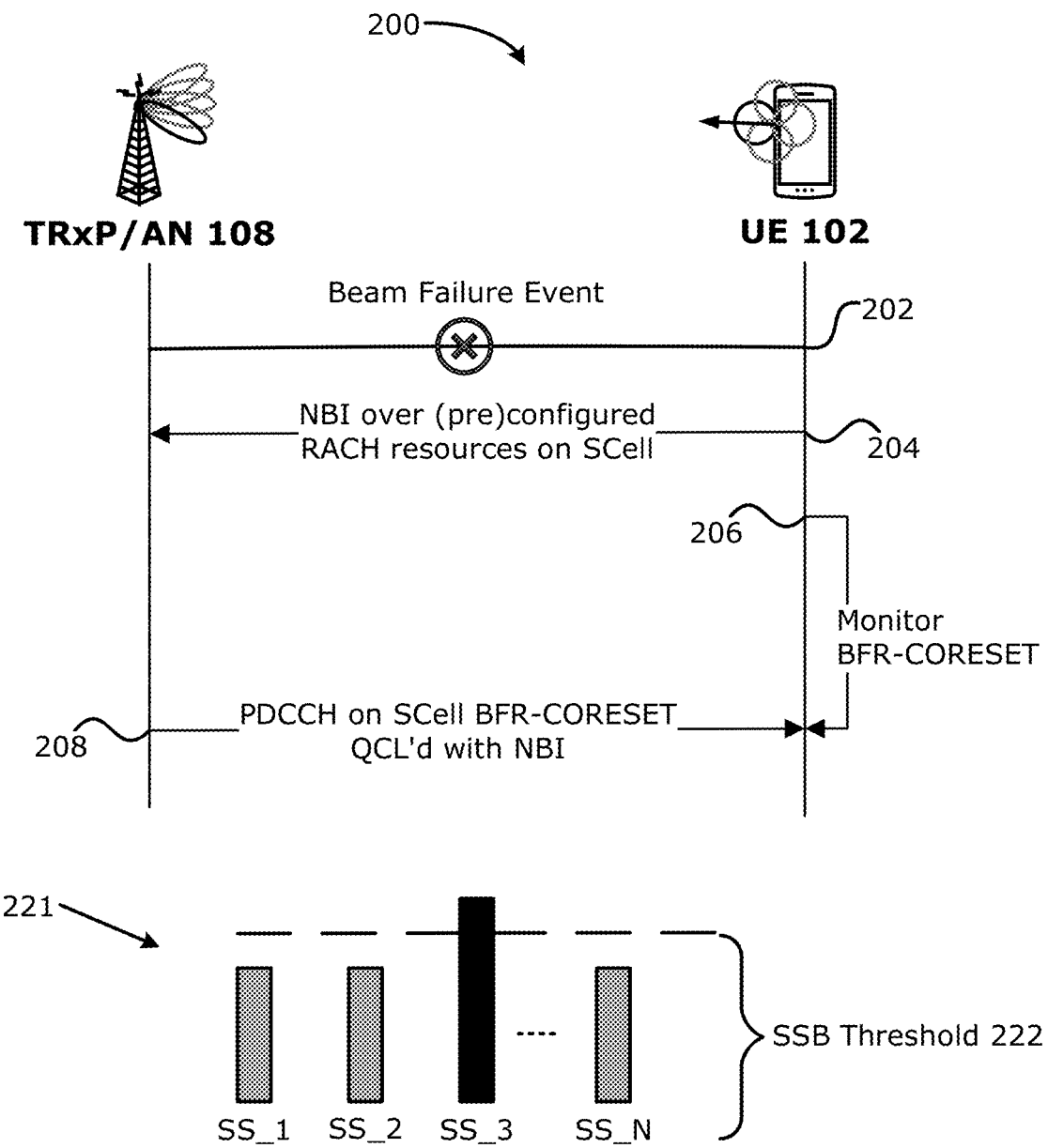
FIGS. 2, 4, and 5 illustrate example Beam Failure Recovery (BFR) procedures according to various embodiments.

Referring now to FIG. 2, which illustrates an example BFR procedure 200 according to various embodiments. The BFR procedure 200 uses periodic PRACH on an SCell. In this embodiment, the UE 102 can directly initiate the BFR procedure step 2 over an SCell when (pre)configured Random Access Channel (RACH) resources are available at the SCell for such a transmission. The BFR procedure 200 begins at operation 202 where the UE 102 detects a beam failure event. In embodiments, the UE 102 may detect a beam failure event based on the measured RSRP of a particular beam. The typical BFR procedure would involve the UE 102 sending a BFRQ to request UL resources for an NBI transmission. However, in this embodiment, operation 202 does not require a BFRQ transmission since the UE 102 is following an initial access procedure using PRACH resources as discussed in more detail infra.

At operation 204, the UE 102 transmits NBI over (pre) configured RACH resources on the SCell, and at operation 206, the UE 102 begins monitoring the BFR CORESET for a PDCCH transmission on the SCell. The NBI may indicate one or more new beams detected/measured by the UE 102. In this example, the UE 102 performs measurements on 1–N beams 221 (e.g., SS_1 to SS_N in FIG. 2, where N is a number), and detected beam associated with SS_3 as exceeding a predetermined or configured SSB measurement threshold 222 (e.g., an RSRP threshold indicated by the parameter rsrp-ThresholdSSB). In this case, the UE 102 may indicate SS_3 in the NBI. Although this example shows only one SSB exceeding the measurement threshold, in some cases, multiple beams may exceed the measurement threshold, and the UE 102 may indicate each of the multiple beams in the NBI. The NBI may be (or may be included in) a message B (MsgB) and/or MAC CE.

At operation 208, the AN 108 transmits a PDCCH transmission on the SCell in a BFR-CORESET that is QCL'd with the NBI. The PDCCH transmitted on the BFR CORESET may include a configuration for use of the beam indicated by the NBI. As mentioned previously, at operation 206 the UE 102 monitors the BFR CORESET for the PDCCH transmission on the SCell to receive the BFR configuration. In some embodiments, the UE 102 determines the BFR CORESET based on the recoverySearchSpaceId field/parameter in the BeamFailureRecoveryConfig information element (IE) (see e.g., Table 3a and Table 3b infra), which indicates a search space to use for receipt of a BFR Random Access Response (RAR). After receipt of the PDCCH on the BFR CORESET, the UE 102 considers the BFR to be successful and completed.

As mentioned previously, the UE 102 can directly initiate the BFR procedure step 2 over the SCell (e.g., operation 204) when (pre)econfigured PRACH resources are available at the SCell for this transmission even if no RACH is available. In these embodiments, the UE 102 does not need to transmit a BFRQ to the AN 108 at operation 202. For example, the UE 102 can perform BFR procedure step 2 if it has an available UL grant to transmit a MAC CE. If the UE 102 has a UL grant to transmit a MAC CE, the UE 102 can encapsulate the MAC CE in that UL grant to indicate BFR.

In some cases when using (pre)configured PRACH resources for BFR procedure step 2, there is a delay $\Delta_{PRACHPeriod}$ associated with PRACH based BFR on the SCell. This delay may be caused by the UE 102 needing to wait for a corresponding PRACH occasion to transmit the NBI (e.g., operation 204 in FIG. 2) based on the configured periodicity and the SSB which meets the SSB measurement threshold 222 (e.g., an RSRP threshold indicated by the parameter rsrp-ThresholdSSB). A PRACH occasion is the time duration (e.g., one or more consecutive symbols) during which the MAC entity is configured to monitor or transmit RA-related messages. Furthermore, multiple PRACH transmissions might be necessary (e.g., depending on configuration) and the overall periodicity of the PRACH occasions might add to the latency.

Figure 3:
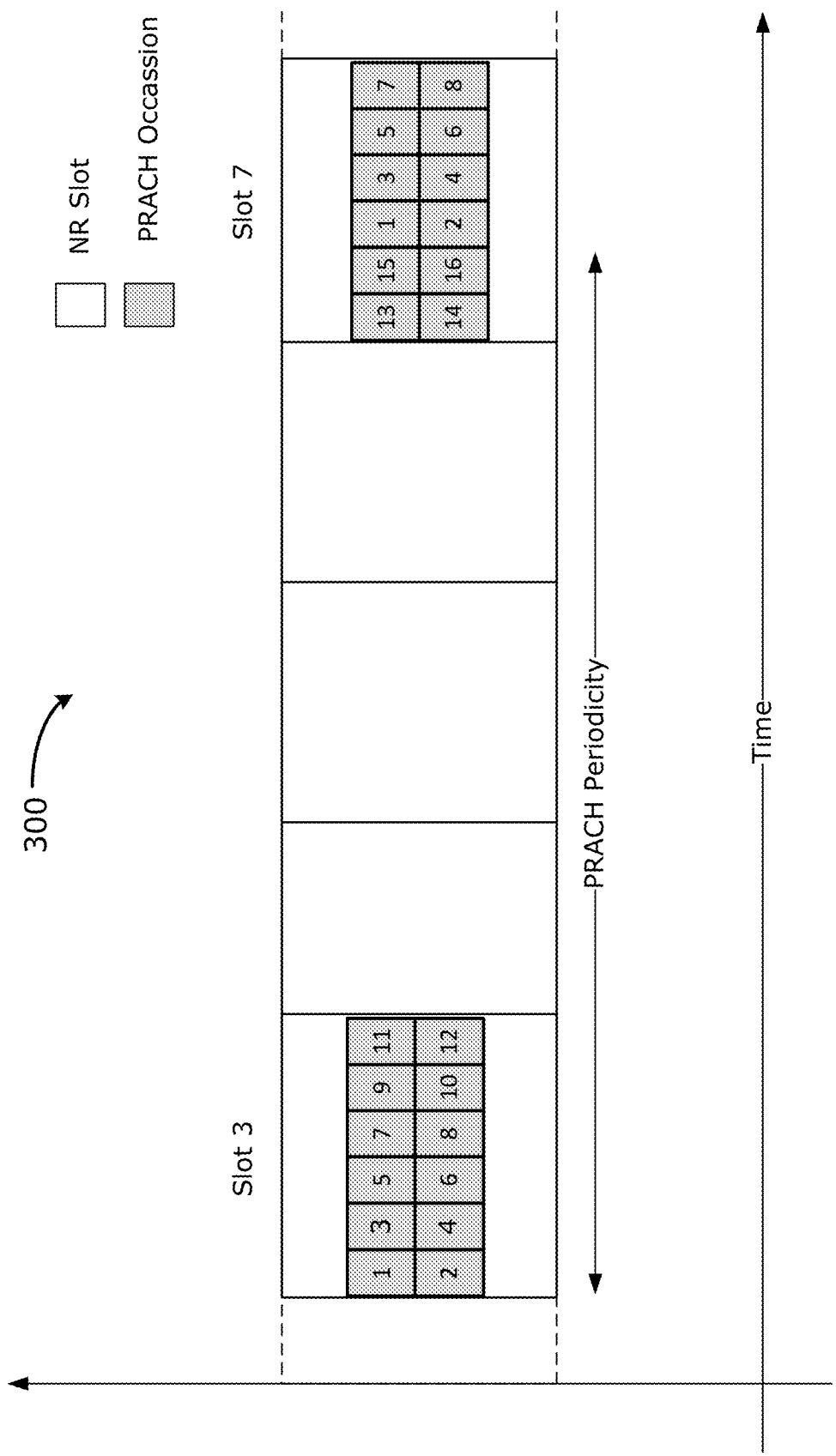
FIG. 3 illustrates an example of Physical Random Access Channel (PRACH) Periodicity based on PRACH index 1 and association with 16 synchronization signal blocks (SSBs), according to various embodiments.

FIG. 3 illustrates an example 300 of PRACH periodicity based on PRACH configuration index 1 and association with 16 SSBs for Frequency Range 2 (FR2) (e.g., 60 kHz). In the example of FIG. 3, 16 beams are configured, and the UE 102 has 12 PRACH occasions within a PRACH slot with 6 PRACH Time Division Multiplexing (TDM) occasions and 2 RACH occasions (ROs) Frequency Division Multiplexed (FDM-ed) within each TDM occasion. The PRACH slots are 3, 7, 11, 15, and so forth, based on configuration index 1. In this case, the best case latency is when SSB 1 is the best beam. However, in the case that SSB 15 corresponds to the best beam, the UE 102 may have to wait 4 slots to transmit on the corresponding RO. Therefore, the latency due to the PRACH periodicity ($\Delta_{PRACHPeriod}$) is a non-negligible component in the overall BFR procedure.

Figure 4:
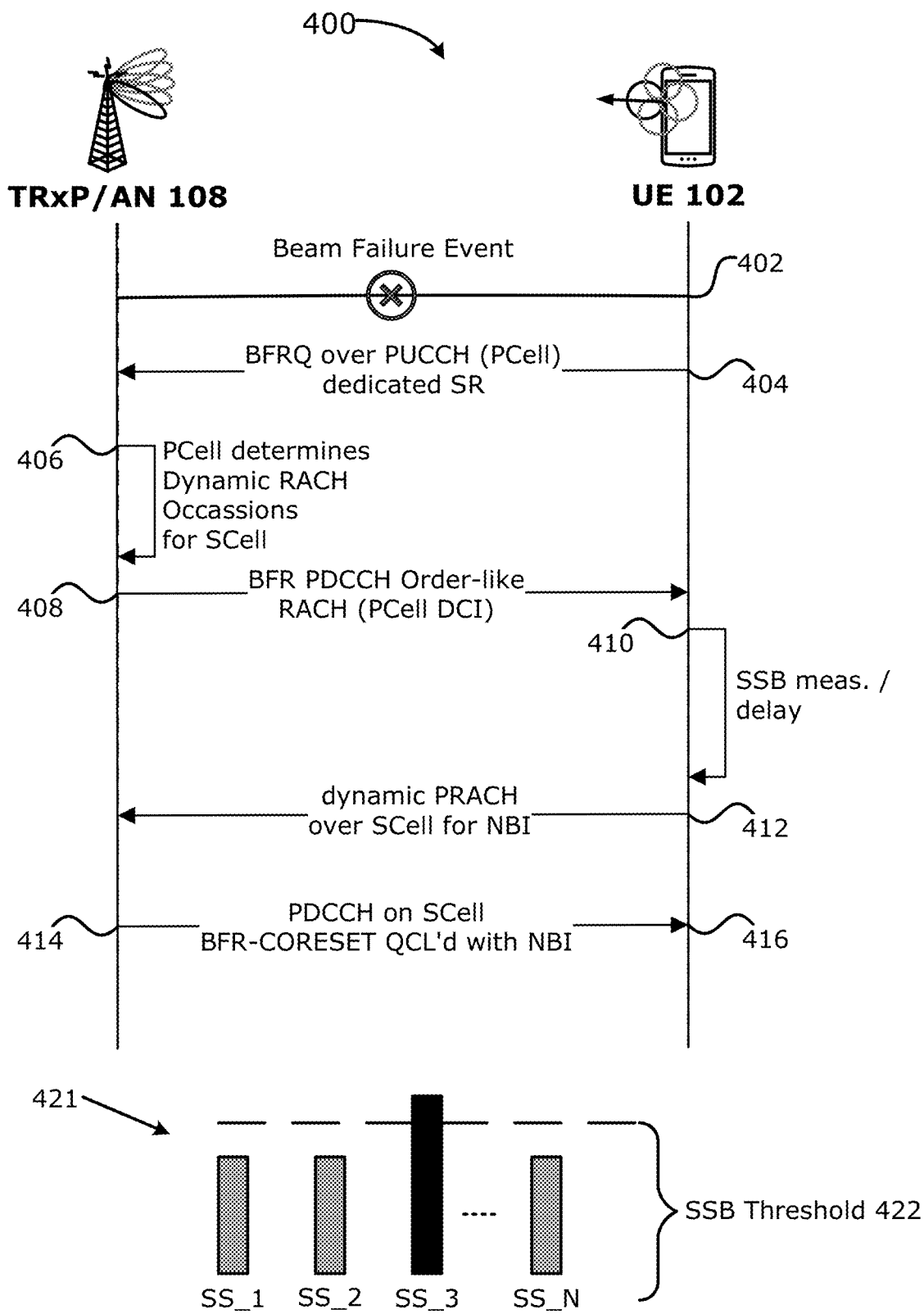

FIG. 4 illustrates another example BFR procedure 400 with PCell triggered PDCCH order-like RACH, according to various embodiments. In this embodiment, the BFR process for SCell follows the BFR procedure step 1 for indicating a beam failure event over an SR-like PUCCH over the PCell when the PCell has active link. In some embodiments, the PCell can trigger a PDCCH order-like dynamic RACH configuration over a PCell DCI.

The BFR procedure 400 begins at operation 402 where the UE 102 detects a beam failure event. In embodiments, the UE 102 may detect a beam failure event based on the measured RSRP of a particular beam. At operation 404, the UE 102 sends a BFRQ over a PCell PUCCH using a dedicated SR. At operation 406, the PCell (AN 108) determines (and configures) dynamic Random Access Channel (RACH) occassions for the SCell. At operation 408, the PCell (AN 108) transmits a BFR PDCCH order-like RACH configuration in PCell downlink control information (DCI).

Prior to initiation of the PRACH procedure, Layer 1 (L1) receives from higher layers a set of SS/PBCH block indexes and provides to higher layers a corresponding set of signal (e.g., RSRP measurements). L1 then receives a (P)RACH configuration of PRACH transmission parameters (e.g., including a PRACH preamble format, a preamble index, a preamble SCS, $P_{PRACH,target}$, a corresponding RA-RNTI, and time and frequency resources for the PRACH transmission), and parameters for determining the root sequences and their cyclic shifts in the PRACH preamble sequence set (e.g., index to logical root sequence table, cyclic shift ($N_{cs}$), and set type (unrestricted, restricted set A, or restricted set B)).

In embodiments, the PDCCH order-like RACH configuration (also referred to as an "PDCCH ordered RACH" configuration or "PDCCH order" configuration) can configure a set of SSB/RACH associations for the UE 102 to measure and respond with NBI on (or during) the RACH occasion corresponding to the SSB above a predetermined or configured SSB measurement threshold 422. In some implementations, the PDCCH ordered RACH configuration includes a Random Access Preamble index field (6 bits) indicating which RA preamble to use in case of contention-free RA procedure, or the value 000000 in case of contention-based RA procedure. Additionally or alternatively, the PDCCH ordered RACH configuration may include a BWP index field indicating which BWP to transmit the RA preamble on, a 1 bit Supplementary UL (SUL) indicator indicating whether to transmit the RA preamble on a SUL carrier or normal UL carrier, an SSB index field (6 bits) to indicate an SSB index, which, in turn, identifies a group of RACH occasions, and/or a PRACH Mask index field (4 bits) to indicate the PRACH mask index that corresponds to the RO(s) in the set of RACH occasions identified by the indicated SSB index. Since a dynamic RACH is configured, the UE 102 does not need to wait for the AN 108 before indicating the NBI. Instead, the UE 102 has control over which SSB/PRACH associations can be configured for the UE 102 to measure and respond.

From the PHY layer perspective, a Type-1 L1 RA procedure includes the transmission of random access preamble (Msg1) in a PRACH, random access response (RAR) message with a PDCCH/PDSCH (Msg2), and when applicable, the transmission of a PUSCH scheduled by a RAR UL grant, and PDSCH for contention resolution. From the PHY layer perspective, a Type-2 L1 RA procedure includes the transmission of random access preamble in a PRACH and of a PUSCH (MsgA) and the reception of a RAR message with a PDCCH/PDSCH (MsgB), and when applicable, the transmission of a PUSCH scheduled by a fallback RAR UL grant, and PDSCH for contention resolution. If an RA procedure is initiated by a PDCCH order to the UE 102, a PRACH transmission is with the same SCS as the PRACH transmission initiated by higher layers.

For link/beam recovery, the UE 102 is provided N SS/PBCH block indexes associated with one PRACH occasion by ssb-perRACH-Occasion in BeamFailureRecovery-Config. For a dedicated RACH configuration provided by RACH-ConfigDedicated, if cfra is provided, a UE is provided N SSB indexes associated with one PRACH occasion by ssb-perRACH-Occasion in occasions. If N<1, one SSB index is mapped to 1/N consecutive valid PRACH occasions. If N≥1, all consecutive N SSB indexes are associated with one PRACH occasion.

SSB indexes provided by ssb-PositionsInBurst in SIB1 or in ServingCellConfigCommon are mapped to valid PRACH occasions in the following order where the parameters are described in [TS38211]: first, in increasing order of preamble indexes within a single PRACH occasion; second, in increasing order of frequency resource indexes for frequency multiplexed PRACH occasions; third, in increasing order of time resource indexes for time multiplexed PRACH occasions within a PRACH slot; and fourth, in increasing order of indexes for PRACH slots.

An association period, starting from frame 0, for mapping SSB indexes to PRACH occasions is the smallest value in the set determined by the PRACH configuration period according to Table 1 or table 8.1-1 in [TS38213] such that $N_{Tx}^{SSB}$ SSB indexes are mapped at least once to the PRACH occasions within the association period, where the UE 102 obtains $N_{Tx}^{SSB}$ from the value of ssb-PositionsInBurst in SIB1 or in ServingCellConfigCommon. If after an integer number of SSB indexes to PRACH occasions mapping cycles within the association period there is a set of PRACH occasions or PRACH preambles that are not mapped to $N_{Tx}^{SSB}$ SSB indexes, no SSB indexes are mapped to the set of PRACH occasions or PRACH preambles. An association pattern period includes one or more association periods and is determined so that a pattern between PRACH occasions and SSB indexes repeats at most every 160 msec. PRACH occasions not associated with SSB indexes after an integer number of association periods, if any, are not used for PRACH transmissions.

TABLE 1

Mapping between PRACH configuration period and SS/PBCH block to PRACH occasion association period

| PRACH configuration period (msec) | Association period (number of PRACH configuration periods) |
|---|---|
| 10 | {1, 2, 4, 8, 16} |
| 20 | {1, 2, 4, 8} |
| 40 | {1, 2, 4} |
| 80 | {1, 2} |
| 160 | {1} |

For a PRACH transmission triggered by a PDCCH order (or "PDCCH ordered RACH"), the PRACH mask index field (see e.g., 3GPP TS 38.212 v15.6.0 (Jun. 24, 2019), if the value of the RA preamble index field is not zero, indicates the PRACH occasion for the PRACH transmission where the PRACH occasions are associated with the SSB index indicated by the SSB index field of the PDCCH order.

The PRACH occasions are mapped consecutively per corresponding SSB index. The indexing of the PRACH occasion indicated by the mask index value is reset per mapping cycle of consecutive PRACH occasions per SS/PBCH block index. The UE 102 selects, for a PRACH transmission, the PRACH occasion indicated by PRACH mask index value for the indicated SSB index in the first available mapping cycle. For the indicated preamble index, the ordering of the PRACH occasions is first, in increasing order of frequency resource indexes for frequency multiplexed PRACH occasions; second, in increasing order of time resource indexes for time multiplexed PRACH occasions within a PRACH slot; and third, in increasing order of indexes for PRACH slots.

If an RA procedure is initiated by a PDCCH order, the UE 102, if requested by higher layers, transmits a PRACH in the selected PRACH occasion, as described in [TS38321], for which a time between the last symbol of the PDCCH order reception and the first symbol of the PRACH transmission is larger than or equal to:

$N_{T,2} + \Delta_{BWPSwitching} + \Delta_{Delay} + T_{switch}$ ms  [Equation 1]

In equation 1, the parameter $N_{T,2}$ is a time duration of $N_2$ symbols corresponding to a PUSCH preparation time for UE processing capability 1 (see e.g., [TS38214]) assuming μ corresponds to the smallest SCS configuration between the SCS configuration of the PDCCH order and the SCS configuration of the corresponding PRACH transmission. Here, $N_2$ symbols refers to the UE processing time value determined in the HARQ/scheduling session with front loaded plus additional DMRS and UE capability 1. In one example, $N_{T,2}$ is 23/36 OFDM symbols.

In equation 1, the parameter $\Delta_{BWPSwitching}$ is a BWP switching time where $\Delta_{BWPSwitching}=0$ if the active UL BWP does not change, otherwise the value of $\Delta_{BWPSwitching}$ is defined in [TS38133]. For example, depending on UE capability bwp-SwitchingDelay (see e.g., 3GPP TS 38.331 v15.6.0 (Jun. 29, 2019) (hereinafter "[TS38331]")), the BWP switch time may be the time duration TBWPswitchDelay defined in Table 8.6.2-1 in [TS38133].

In equation 1, the parameter $\Delta_{Delay}$ includes at least MAC layer delay in initializing PRACH where $\Delta_{Delay}$ is 0 microseconds (μs), 150 μs, 300 μs, 500 μs, 1.5 ms, or somewhere between 0 ms and 1.5 ms. In some embodiments, $\Delta_{Delay}=0.5$ ms for frequency range 1 (FR1) and $\Delta_{Delay}=0.25$ ms for FR2.

In equation 1, the parameter $T_{switch}$ is a switching gap duration as defined in [TS38214]. If uplink switching gap is triggered as defined in clause 6.1.6 in [TS38214], $T_{switch}$ equals to the switching gap duration and for the UE 102 configured with uplinkTxSwitchingOption2 $\mu_{UL}=\min(\mu_{UL,carrier1}, \mu_{UL,carrier2})$ where the $\mu_{UL,carrier1}$ corresponds to the subcarrier spacing of the uplink transmitted before the switching gap and the $\mu_{UL,carrier2}$ corresponds to the subcarrier spacing of the uplink transmitted after the switching gap, otherwise $T_{switch}=0$.

At operation 410, the UE 102 performs measurements on 1–N beams 421 (e.g., SS_1 to SS_N in FIG. 4, where N is a number), and identifies one or more beams exceeding a predetermined or configured SSB measurement threshold 422 (e.g., an RSRP threshold indicated by the parameter rsrp-ThresholdSSB or rsrp-ThresholdBFR-r16). Although this example shows only one SSB exceeding the measurement threshold, in some cases, multiple beams may exceed the measurement threshold, and the UE 102 may indicate each of the multiple beams in the NBI. In the example of FIG. 4, the UE 102 measures SS_3 as exceeding the SSB measurement threshold and indicates SS_3 in the NBI to be sent at operation 412. At operation 412, the UE 102 transmits the dynamic PRACH over the SCell for NBI.

At operation 414, the AN 108 transmits a PDCCH transmission on the SCell BFR-CORESET QCL with NBI, and at operation 416, the UE 102 monitors the BFR-CORESET to receive and decode the PDCCH transmission. The UE 102 declares the BFR to be successful when the UE 102 receives the PDCCH on BFR CORESET.

As mentioned previously, there may be some delay due to performing the aforementioned measurements (e.g., at operation 410) and/or waiting for the configured RO before transmitting the dynamic PRACH over SCell for NBI at operation 412.

In various embodiments, the delay in transmission of the PRACH may additionally or alternatively include a delay in transmission of the first PRACH symbol transmission as well as delay based on the configured RACH periodicity, which may be expressed as shown by equation 2:

$(N_{T,2} + \Delta_{BWPSwitching} + \Delta_{Delay}) + \Delta_{PRACHPeriod}$  [Equation 2]

The values of $N_{T,2}$, $\Delta_{BWPSwitching}$, and $\Delta_{Delay}$ are explained previously with respect to equation 1. The delay due to PRACH periodicity ($\Delta_{PRACHPeriod}$), in some embodiments, is an SSB-RO Based Delay. The SSB-RO Based Delay is the time period for SSB to RO association (e.g., $T_{SSB-RO}$), which may be equal to one or multiple PRACH configuration periods. In one embodiment, the number of PRACH configuration periods in the $T_{SSB-RO}$ is the smallest value in the set {1, 2, 4, 8} such that the number of PRACH configuration periods is greater than or equal to the ceiling of the actually transmitted SSBs/SSBs that can be mapped to one PRACH configuration period (e.g., ≥⌈Actually transmitted SSBs/SSBs that can be mapped to one PRACH configuration period⌉). In another embodiment, the number of PRACH configuration periods in the $T_{SSB-RO}$ is the smallest value in the set determined by the RACH configuration period from Table 1 (supra) such that the number of PRACH configuration periods is greater than or equal to the ceiling of the actually transmitted SSBs/SSBs that can be mapped to one PRACH config period (e.g., ≥[Actually transmitted SSBs/SSBs that can be mapped to one PRACH config period]). The values of equations 1 and 2 may be expressed in milliseconds (ms).

One advantage of using dynamically configured PRACH occasions can be used which might save overhead due to wasted RACH resources and lead to better dimensioning of contention-free RA (CFRA) over SCell. This can potentially reduce latency depending on how many SSBs need to be configured for beam detection. If the AN 108 can configure fewer SSBs, then the latency due to RACH periodicity may also be reduced.

In other embodiments, the MAC CE may be transmitted over single or multi-slot PUSCH on the UL SCell for BFR. For these embodiments, the PRACH is not used for BFR procedure step 2 to convey NBI. Instead, a PUSCH with a MAC CE containing information related to the NBI can be scheduled over a single or multiple slots for the BFR procedure step 2. As an example, pusch-AggregationFactor is used to configure multiple PUSCH repetitions for the PUSCH carrying the MAC CE. The parameter pusch-AggregationFactor indicates the number of repetitions for data (see e.g., clause 6.1.2.1 in [TS36214]); if the field is absent the UE 102 applies a value 1. The parameter pusch-AggregationFactor is included in the PUSCH-Config IE, which is used to configure the UE 102 with specific PUSCH parameters applicable to a particular BWP. In case of multi-slot based transmission, the UE 102 may be required to maintain the same spatial filter over all repetitions of the PUSCH. In case the PUSCH conveying MAC CE is scheduled with re-transmission, the UE 102 can apply another spatial filter for the transmission. This may be used to, for example, support Tx beam sweeping for the UE 102 not having beam correspondence (beam correspondence with SRS). An example of such embodiments is shown by FIG. 5.

Figure 5:
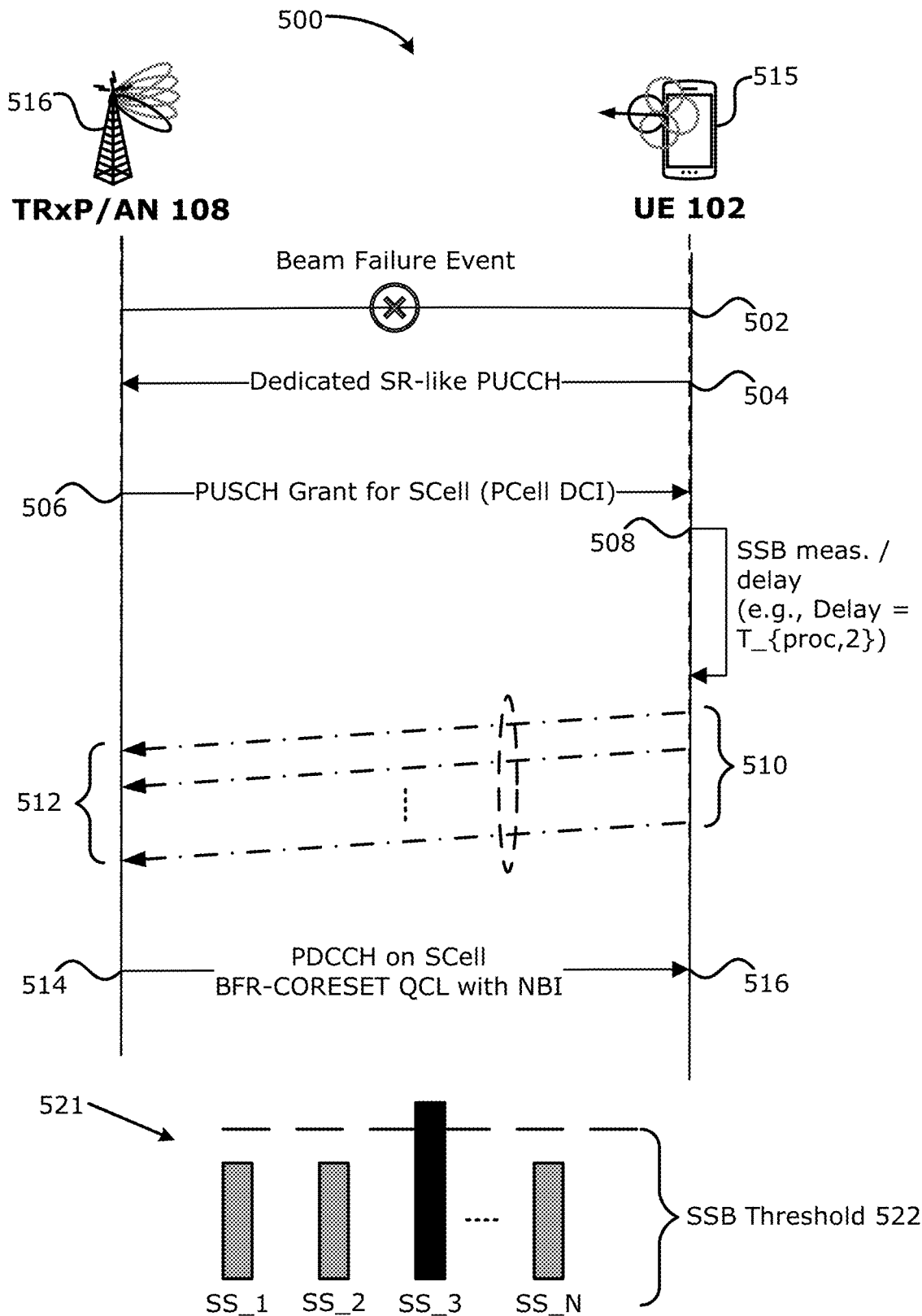

FIG. 5 illustrates another example BFR procedure 500, according to various embodiments. In the BFR procedure 500, an SCell PUSCH including a MAC CE is used to convey the NBI. In this embodiment, the BFR procedure step 1 is similar to the PCell BFRQ procedure 200 of FIG. 2. The BFR procedure 500 begins at operation 502 where the UE 102 detects a beam failure event in a same or similar manner as operation 202 in procedure 200 of FIG. 2. At operation 504, the UE 102 transmits a BFRQ over a PCell dedicated SR-like PUCCH. In response, the AN 108 (PCell) configures a single or multi-slot PUSCH grant, and at operation 506, the AN 108 (PCell) signals the PUSCH grant for the SCell via PCell DCI. At operation 508, the UE 102 performs measurements on 1–N beams 521 (e.g., SS_1 to SS_N in FIG. 5, where N is a number), and identifies one or more beams exceeding a predetermined or configured SSB measurement threshold 522 (e.g., an RSRP threshold indicated by the parameter rsrp-ThresholdSSB or rsrp-ThresholdBFR-r16). Operation 508 may be the same or similar as operation 408 in procedure 400 of FIG. 4, and may include the same or similar delay as discussed previously. Although this example shows only one SSB exceeding the measurement threshold, in some cases, multiple beams may exceed the measurement threshold, and the UE 102 may indicate each of the multiple beams in the NBI.

At operation 510, the UE 102 transmits the MAC CE including or indicating the NBI over the failed SCell PUSCH instead of transmitting the MAC CE over the PCell (as was the case in the previously described procedures). In embodiments, the MAC CE includes the CC index of the failed beam/SCell, the SSB index of the failed beam/SCell, and/or other like NBI. In case of multi-slot transmissions, the same MAC CE is transmitted over all the slots. The PUSCH repetition can be performed with the same redundancy version (RV) or RV cycling.

At operation 512, the AN 108 receives the one or more PUSCH repeated transmissions decodes the MAC CE. Since the SCell has failed, the AN 108 may not have an ideal beam alignment for reception of the PUSCH transmission. Additionally or alternatively, the UE 102 may not have the best beam for transmitting the PUSCH transmission. In these cases, the AN 108 can either beam sweep over multiple transmissions or combine PUSCHs over multiple beams/retransmissions to leverage some processing gain and/or beam sweeping gain over these beams to decode the MAC CE. The AN 108 does not necessarily need the most optimal beam in order to decode the MAC CE in the received PUSCH, provided combining gain can be leveraged.

Once the MAC CE is decoded, the BFR procedure can proceed at operation 514, where the AN 108 transmits the PDCCH on SCell BFR-CORESET that is QCL'd with the NBI, and the UE 102 monitors the BFR-CORESET that is QCL'd with the indicated NBI. The UE 102 considers/declares the BFR to be successful when the UE 102 receives the PDCCH on the BFR-CORESET (or properly decodes the candidates on the BFR-CORESET).

As alluded to previously, in procedure 500, as long as the AN 108 does not reconfigure the UE 102 to use a new beam, the UE 102 potentially is not using a new beam to convey the MAC CE and may attempt to transmit the PUSCH on the failed beam. To improve the chances of the AN 108 actually receiving the PUSCH transmission, in some embodiments, the UE 102 may independently determine and select better beam than the failed beam based on the NBI (identified at operation 508). In these embodiments, the UE 102 can expect a PUSCH grant either over PCell or SCell. After the beam failure has occurred at operation 502, the UE 102 is not expected to transmit the PUSCH over the SCell based on a preconfigured spatial filter. The spatial filter is a function that is used to determine the shape and direction of a beam. The spatial filter is sometimes referred to as Beam Forming Function or Mapping Function. By applying the preconfigured spatial filter to transmit the PUSCH over the SCell means that the UE 102 would form the same beam as the failed beam (e.g., a beam having the same direction, shape, and power characteristics as the failed beam). Instead of using the same spatial filter, in these embodiments the UE 102 is expected to choose/select a Tx spatial filter on the UL. In one example, the Tx spatial filter can be the same as the Rx spatial filter used by the UE 102 for measurement of the BFD RSs and/or indicated in the NBI. In another example, the UE 102 can select a different spatial filter for the PUSCH transmission than the one used for the BFD RS measurements and/or as indicated by the NBI. In yet another example, the UE 102 may select a potentially different spatial filter for UL transmission for each of the PUSCH repetitions at operation 510, if configured.

In addition to any of the aforementioned embodiments, the BFR procedure step 3 may include RRC configuration and/or MAC CE activation of new TCI state(s) on the SCell according to the NBI. In these embodiments, the corresponding signalling can be carried out through PCell.

Figure 6:
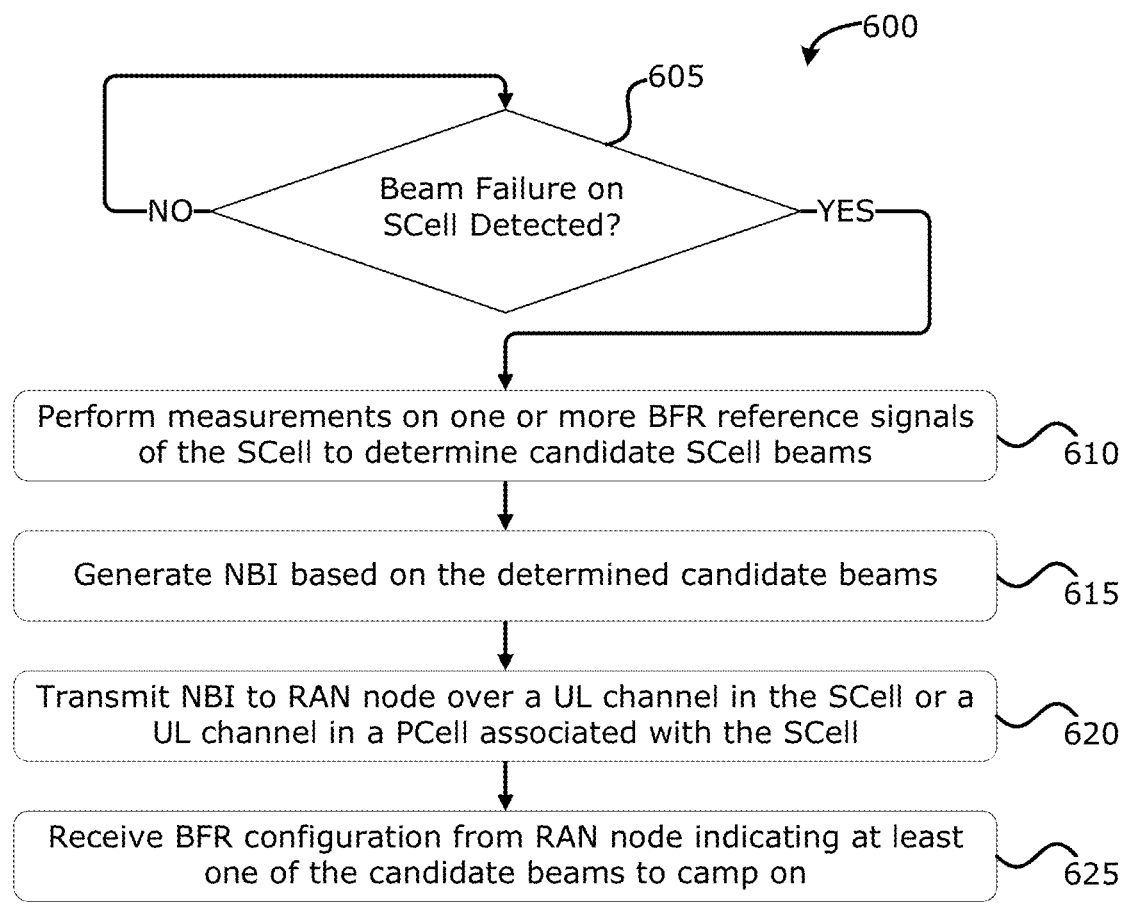
FIGS. 6-7 show an example processes for practicing various embodiments herein.
Figure 7:
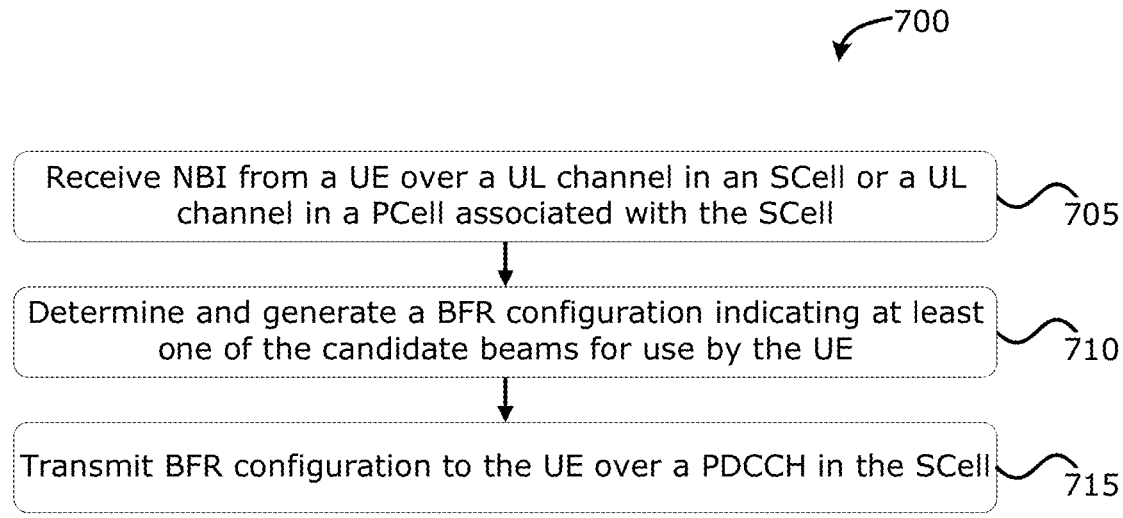

FIGS. 6 and 7 processes 600 and 700, respectively, in accordance with various embodiments. For illustrative purposes, the various operations of process 600 are described as being performed by the UE 102 or elements thereof, the various operations of process 700 are described as being performed by the RAN node 108 or elements thereof. Additionally, the various messages/signaling communicated between the UE 102 and RAN node 108 may be sent/received over the various interfaces discussed herein with respect to FIGS. 1-5, and using the various mechanisms discussed herein including those discussed herein with respect to FIGS. 1-5. While particular examples and orders of operations are illustrated FIGS. 6 and 7, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Referring now to FIG. 6, process 600 begins at operation 605 where the UE 102 determines whether a beam failure event has been detected in the manner described previously. If the UE 102 does not detect a beam failure event in an SCell, the UE 102 continues to monitor for beam failure events. If the UE 102 does detect a beam failure event, the UE 102 proceeds to operation 610 where the UE 102 performs measurements on one or more BFR reference signals of the SCell to determine candidate SCell beams. At operation 615, the UE 102 generates NBI to indicate the determined candidate beams. At operation 620, the UE 102 transmits the NBI to RAN node 108 over a UL channel in the SCell or a UL channel in a PCell associated with the SCell. At operation 625, the UE 102 receives a BFR configuration from RAN node 108 indicating at least one of the candidate beams to camp on. The RAN node 108 may transmit the BFR configuration to the UE 102 over a BFR CORESET of a PDCCH on the SCell that is QCL'd with at least one beam indicated by the NBI. The UE 102 monitors (e.g., attempts to decode) the BFR CORESET of the PDCCH to obtain the BFR configuration from the RAN node 108. The UE 102 considers process 600 to be successfully completed when the BFR configuration is properly decoded based on the monitoring of the BFR CORESET.

Referring now to FIG. 7, process 700 begins at operation 705 where the RAN node 108 receives NBI from the UE 102 over a UL channel in an SCell or a UL channel in a PCell associated with the SCell. At operation 710, the RAN node 108 determines and generates a BFR configuration indicating at least one of the candidate beams for use by the UE 102. The RAN node 108 determines the BFR configuration based on the candidate beams indicated by the NBI. At operation 715, the RAN node 108 transmits the BFR configuration to the UE 102 over a BFR CORESET of a PDCCH on the SCell that is QCL'd with at least one beam indicated by the NBI. The UE 102 monitors the BFR CORESET of the PDCCH to obtain the BFR configuration from the RAN node 108. The UE 102 considers process 600 to be successfully completed when the BFR configuration is properly decoded based on the monitoring of the BFR CORESET.

1.4. MAC and RCC Configuration Embodiments

Figure 8:
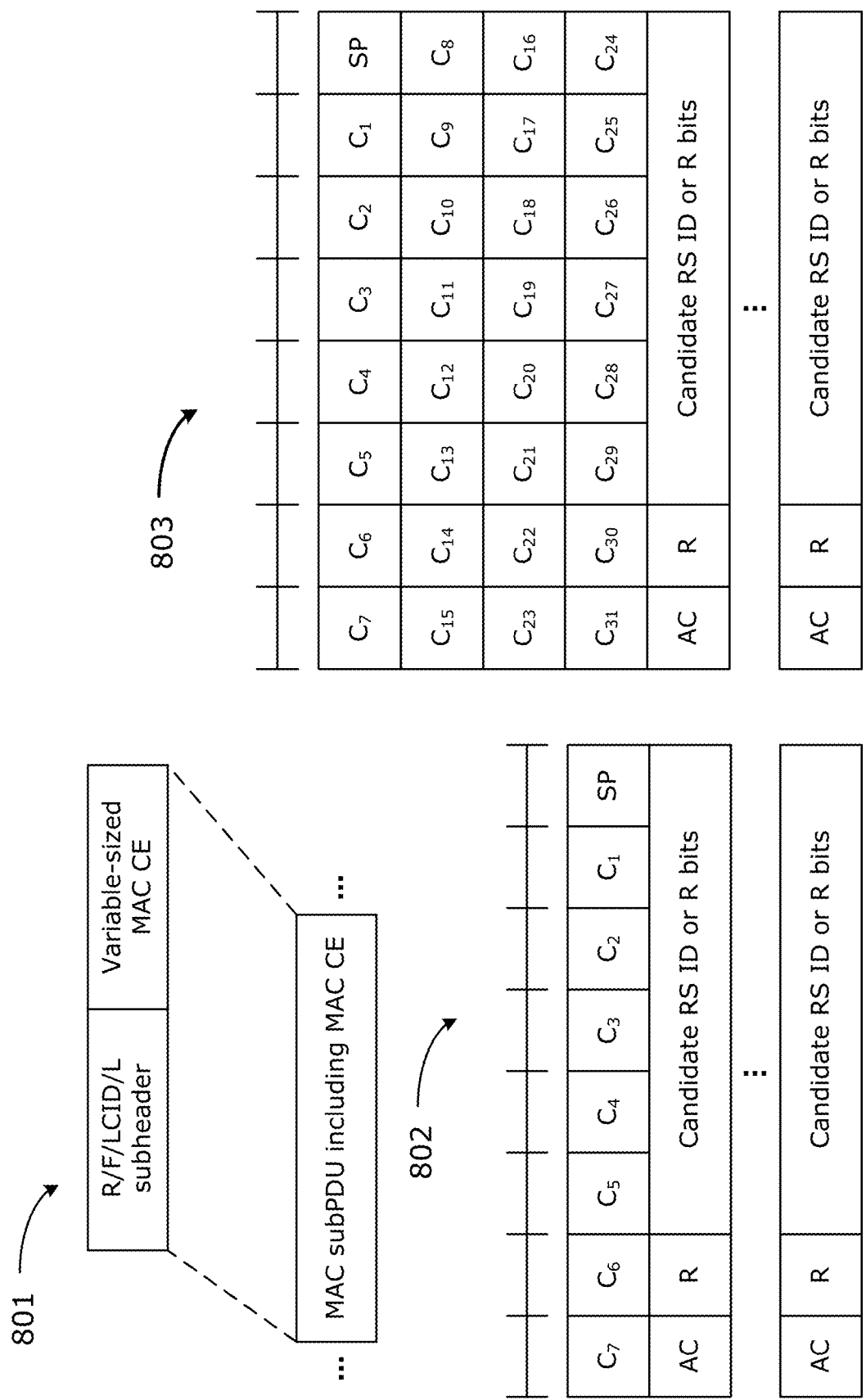
FIG. 8 illustrates an example Medium Access Control (MAC) Protocol Data Unit (PDU) and example MAC Control Elements (CEs) according to various embodiments.

FIG. 8 shows an example MAC PDU 801 according to various embodiments. The MAC PDU 801 is a bit string that is byte aligned (e.g., multiple of 8 bits) in length. The MAC PDU 801 includes one or more MAC subPDUs. Although FIG. 8 only shows a single MAC subPDU, the MAC PDU 801 could include multiple MAC subPDUs. The MAC PDU 801 may be a DL MAC PDU including one or more DL MAC subPDUs, or a UL MAC PDU including one or more UL MAC subPDUs. DL MAC subPDU(s) with MAC CE(s) is/are placed before any MAC subPDU with MAC SDU and MAC subPDU with padding. UL MAC subPDU(s) with MAC CE(s) is/are placed after all the MAC subPDU(s) with MAC SDU and before the MAC subPDU with padding in the MAC PDU. MAC CEs are placed together within the MAC PDU 801. The size of padding can be zero.

In the example of FIG. 8, the MAC subPDU includes a MAC subheader and a MAC CE. Although not shown by FIG. 8, one or more MAC subPDUs in a MAC PDU could include a MAC subheader only, a MAC subheader and a MAC Service Data Unit (SDU), or a MAC subheader and padding. A MAC subheader is a bit string that is byte aligned (e.g., multiple of 8 bits) in length. Each MAC subheader is placed immediately in front of the corresponding MAC CE (or MAC SDU or padding).

MAC CEs used for BFRs are usually variable-sized MAC CEs. A MAC subheader for a variable-sized MAC CE includes the header fields R/F/LCID/(eLCID)/L. Although not shown by FIG. 8, a MAC subheader for a fixed sized MAC CE may include two header fields R/LCID.

The Logical Channel ID (LCID) field identifies the logical channel instance of the corresponding MAC SDU, a MAC CE type of the corresponding MAC CE, or padding as described by Tables 6.2.1-1 and 6.2.1-2 in [TS38321] for the DL shared channel (DL-SCH) and UL shared channel (UL-SCH), respectively. As examples, when the MAC PDU 800 is an UL MAC PDU 800, the LCID field may include a value of 46 to indicate that the MAC CE is an SCell BFR with four octets a value of 47 to indicate that the MAC CE is an SCell BFR with one octet a value of 48 to indicate that the MAC CE is a truncated SCell BFR with four octets or a value of 48 to indicate that the MAC CE is a truncated SCell BFR with one octet There is one LCID field per MAC subheader. The LCID field size is 6 bits.

If the LCID field is set to 34, one additional octet is present in the MAC subheader containing the eLCID field and follow the octet containing LCID field. If the LCID field is set to 33, two additional octets are present in the MAC subheader containing the eLCID field and these two additional octets follow the octet containing LCID field. The extended Logical Channel ID (eLCID) field identifies the logical channel instance of the corresponding MAC SDU as described by tables 6.2.1-1a, 6.2.1-1b, 6.2.1-2a and 6.2.1-2b in [TS38321] for DL-SCH and UL-SCH respectively. The size of the eLCID field is either 8 bits or 16 bits.

The Length (L) field indicates the length of the corresponding MAC SDU or variable-sized MAC CE in bytes. There is one L field per MAC subheader except for subheaders corresponding to fixed-sized MAC CEs, padding, and MAC SDUs containing UL CCCH. The size of the L field is indicated by the F field.

The Format (F) field indicates the size of the Length field. There is one F field per MAC subheader except for subheaders corresponding to fixed-sized MAC CEs, padding, and MAC SDUs containing UL CCCH. The size of the F field is 1 bit. The value 0 indicates 8 bits of the Length field. The value 1 indicates 16 bits of the Length field. The reserved bit field (R) is set to 0. The MAC entity ignores the value of the Reserved bits (R) in DL MAC PDUs.

FIG. 8 also shows examples BFR MAC CEs 802 and 803 according to various embodiments. The BFR MAC CEs 802 and 803 may be used to indicate SCell beam failure information (e.g., failed beam(s), BFRQ, etc.), and may also be used to indicate candidate beams (e.g., NBI) The BFR MAC CEs 802 and 803 may be included in a MAC subPDU (or MAC PDU 801). A MAC CE is a bit string that is byte aligned (e.g., multiple of 8 bits) in length. In FIG. 8, bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a MAC PDU (e.g., MAC PDU 800 of FIG. 8) is represented with the first and most significant bit in the leftmost bit and the last and least significant bit in the rightmost bit.

Each of the BFR MAC CEs 802-3 may be either a BFR MAC CE or a truncated BFR MAC CE. The MAC CE 802 may be used as an SCell BFR and/or a Truncated BFR MAC CE with the highest ServCellIndex of the MAC entity's SCell configured with BFD is less than 8. The MAC CE 803 may be used as an SCell BFR and/or a Truncated BFR MAC CE with the highest ServCellIndex of the MAC entity's SCell configured with BFD is equal to or higher than 8.

The BFR MAC CEs 802, 803 are identified by a MAC subheader with LCD as specified by table 6.2.1-2 in [TS38321] or as discussed previously. The BFR MAC CEs 802, 803 may have a variable size. Each The BFR MAC CE 802, 803 includes a bitmap and in ascending order based on the ServCellIndex, BFR information (e.g., octets containing candidate beam availability indication (AC) for SCells indicated in the bitmap). For a BFR MAC CE 802, 803, a single octet bitmap is used when the highest ServCellIndex of the MAC entity's SCell for which beam failure is detected is less than 8, otherwise four octets are used. In some implementations, a MAC PDU contains at most one BFR MAC CE 802, 803.

For truncated BFR MAC CEs 802, 803, a single octet bitmap is used when the highest ServCellIndex of the MAC entity's SCell for which beam failure is detected is less than 8, or when beam failure is detected for an SpCell (as specified in Clause 5.17 of [TS38321]) and the SpCell is to be indicated in a Truncated BFR MAC CE 802, 803 and the UL-SCH resources available for transmission cannot accommodate the Truncated BFR MAC CE with the four octets bitmap plus its subheader as a result of LCP. Otherwise four octets are used. The fields in the non-truncated or truncated BFR MAC CE 802, 803 are as follows.

The SP field indicates beam failure detection (as specified in clause 5.17 of [TS38321]) for an SpCell of this MAC entity. The SP field is set to 1 to indicate that beam failure is detected for SpCell only when BFR MAC CE or Truncated BFR MAC CE is to be included into a MAC PDU as part of Random Access Procedure (as specified in 5.1.3a and 5.1.4), otherwise, it is set to 0.

The $C_i$ (where i is a number) field for (non-truncated) BFR MAC CEs indicates BFD (as specified in clause 5.17 of [TS38321]) and the presence of an octet containing the AC field for the SCell with ServCellIndex i as specified in [TS38331]. The $C_i$ field set to 1 indicates that beam failure is detected and the octet containing the AC field is present for the SCell with ServCellIndex i. The $C_i$ field set to 0 indicates that the beam failure is not detected and the octet containing the AC field is not present for the SCell with ServCellIndex i. The octets containing the AC field are present in ascending order based on the ServCellIndex.

The $C_i$ field for truncated BFR MAC CEs indicates beam failure detection (as specified in clause 5.17 of [TS38321]) for the SCell with ServCellIndex i as specified in [TS38331]. The $C_i$ field set to 1 indicates that beam failure is detected and the octet containing the AC field for the SCell with ServCellIndex i may be present. The $C_i$ field set to 0 indicates that the beam failure is not detected and the octet containing the AC field is not present for the SCell with ServCellIndex i. The octets containing the AC field, if present, are included in ascending order based on the ServCellIndex. The number of octets containing the AC field included is maximised, while not exceeding the available grant size. The number of the octets containing the AC field in the truncated BFR MAC CE 802, 803 can be zero.

The AC field indicates the presence of the Candidate RS ID field in this octet. If at least one of the SSBs with SS-RSRP above rsrp-ThresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead. The reserved bit field (R) is set to 0.

The Candidate RS ID field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. In some implementations, the index of an SSB or CSI-RS is the index of an entry in candidateBeamRSSCellList corresponding to that SSB or CSI-RS. In one example, index 0 corresponds to a first entry in candidateBeamRSSCellList, index 1 corresponds to second entry in this list, and so forth. The length of this field is 6 bits.

The MAC entity may be configured by RRC per Serving Cell with a BFR procedure, which is used for indicating to the serving AN 108 of a new SSB or CSI-RS when beam failure is detected on the serving SSB(s)/CSI-RS(s). As mentioned previously, beam failure is detected by counting beam failure instance indication from the lower layers to the MAC entity. If beamFailureRecoveryConfig is reconfigured by upper layers during an ongoing RA procedure for BFR, the MAC entity may stop the ongoing RA procedure and initiate an RA procedure using the new configuration.

The RRC layer may configure the UE 102 with various parameters for BFD and BFR using the BeamFailureRecoveryConfig and RadioLinkMonitoringConfig IEs. The BeamFailureRecoveryConfig IE is used to configure the UE with RACH resources and candidate beams for beam failure recovery in case of beam failure detection (see e.g., [TS38321], clause 5.1.1). The RadioLinkMonitoringConfig IE is used to configure radio link monitoring for detection of beam- and/or cell radio link failure (see e.g., [TS38321], clause 5.1.1). The RRC layer may configure some or all of the parameters in the BeamFailureRecoveryConfig IE and the RadioLinkMonitoringConfig IE for the BFD and BFR procedures as shown by Table 2a Table 2b, Table 3a, and Table 3b.

TABLE 2a

BeamFailureRecoveryConfig information element

```
-- ASN1START
-- TAG-BEAMFAILURERECOVERYCONFIG-START
BeamFailureRecoveryConfig  ::=    SEQUENCE {
    rootSequenceIndex-BFR        INTEGER (0..137)
OPTIONAL,  --  Need M
    rach-ConfigBFR               RACH-ConfigGeneric
OPTIONAL,  --  Need M
    rsrp-ThresholdSSB            RSRP-Range
```

TABLE 2a-continued

BeamFailureRecoveryConfig information element

```
OPTIONAL, -- Need M
    candidateBeamRSList          SEQUENCE  (SIZE(1..maxNrofCandidateBeams) )  OF
PRACH-ResourceDedicatedBFR   OPTIONAL,  --  Need M
    ssb-perRACH-Occasion        ENUMERATED  {oneEighth, oneFourth, oneHalf,
one, two,
                                four, eight, sixteen}
OPTIONAL, -- Need M
    ra-ssb-OccasionMaskIndex       INTEGER   (0..15)
OPTIONAL, -- Need M
    recoverySearchSpaceId         SearchSpaceId
OPTIONAL, -- Need R
    ra-Prioritization             RA-Prioritization
OPTIONAL, -- Need R
    beamFailureRecoveryTimer      ENUMERATED {ms10,  ms20,  ms40,  ms60, ms80,
ms100,  ms150,  ms200}    OPTIONAL,  -- Need M
    . . . ,
    [ [
    msg1-SubcarrierSpacing         SubcarrierSpacing
OPTIONAL   --   Need M
    ] ],
    [ [
    ra-PrioritizationTwoStep-r16             RA-Prioritization
OPTIONAL,   --  Need R
    candidateBeamRSListExt-v1610         SetupRelease{  CandidateBeamRSListExt-r16  }
OPTIONAL   --   Need M
    ] ]
}
PRACH-ResourceDedicatedBFR   : :=  CHOICE  {
    ssb                   BFR-SSB-Resource,
    csi-RS                BFR-CSIRS-Resource
}
BFR-SSB-Resource   : :=            SEQUENCE  {
    ssb                 SSB-Index,
    ra-PreambleIndex            INTEGER (0..63),
    . . .
}
BFR-CSIRS-Resource   : :=            SEQUENCE  {
    csi-RS              NZP-CSI-RS-ResourceId,
    ra-OccasionList           SEQUENCE
                        (SIZE(1..maxRA-OccasionsPerCSIRS) )  OF
INTEGER  (0..maxRA-Occasions-1)    OPTIONAL,   --  Need R
    ra-PreambleIndex           INTEGER  (0..63)
OPTIONAL, -- Need R
    . . .
}
CandidateBeamRSListExt-r16:  :=        SEQUENCE (SIZE(1..
maxNrofCandidateBeamsExt-r16) )  OF  PRACH-ResourceDedicatedBFR
-- TAG-BEAMFAILURERECOVERYCONFIG-STOP
-- ASN1STOP
```

TABLE 2b

BeamFailureRecoveryConfig field descriptions

BeamFailureRecoveryConfig field descriptions
beamFailureRecoveryTimer
Timer for beam failure recovery timer. Upon expiration of the timer the UE does not use CFRA for BFR. Value in ms. Value ms10 corresponds to 10 ms, value ms20 corresponds to 20 ms, and so on.
candidateBeamRSList, candidateBeamRSListExt-v1610
The list of reference signals (CSI-RS and/or SSB) identifying the candidate beams for recovery and the associated RA parameters. The UE shall consider this list to include all elements of candidateBeamRSList (without suffix) and all elements of candidateBeamRSListExt-v1610. The network configures these reference signals to be within the linked DL BWP (i.e., within the DL BWP with the same bwp-Id) of the UL BWP in which the BeamFailureRecoveryConfig is provided.
msg1-SubcarrierSpacing
Subcarrier spacing for contention free beam failure recovery. Only the values 15 kHz or 30 kHz (FR1), and 60 kHz or 120 kHz (FR2) are applicable. See [TS38211], clause 5.3.2.
rsrp-ThresholdSSB
L1-RSRP threshold used for determining whether a candidate beam may be used by the UE to attempt contention free random access to recover from beam failure (see [TS38213], clause 6).
ra-prioritization
Parameters which apply for prioritized random access procedure for BFR (see [TS38321], clause 5.1.1).
ra-PrioritizationTwoStep
Parameters which apply for prioritized 2-step random access procedure for BFR (see [TS38321], clause 5.1.1).
ra-ssb-OccasionMaskIndex TABLE 2b-continued BeamFailureRecoveryConfig field descriptions Explicitly signalled PRACH Mask Index for RA Resource selection in [TS38321]. The mask is valid for all SSB resources.
rach-ConfigBFR
Configuration of contention free random access occasions for BFR.
recoverySearchSpaceId
Search space to use for BFR RAR. The network configures this search space to be within the linked DL BWP (i.e., within the DL BWP with the same bwp-Id) of the UL BWP in which the BeamFailureRecoveryConfig is provided. The CORESET associated with the recovery search space cannot be associated with another search space.
Network always configures the UE with a value for this field when contention free random access resources for BFR are configured.
rootSequenceIndex-BFR
PRACH root sequence index (see [TS38211], clause 6.3.3.1) for beam failure recovery.
ssb-perRACH-Occasion
Number of SSBs per RACH occasion for CF-BFR, see [TS38213], clause 8.1.
BFR-CSIRS-Resource field descriptions
csi-RS
The ID of a NZP-CSI-RS-Resource configured in the CSI-MeasConfig of this serving cell. This reference signal determines a candidate beam for beam failure recovery (BFR).
ra-OccasionList
RA occasions that the UE shall use when performing BFR upon selecting the candidate beam identified by this CSI-RS. The network ensures that the RA occasion indexes provided herein are also configured by prach-ConfigurationIndex and msg1-FDM. Each RACH occasion is sequentially numbered, first, in increasing order of frequency resource indexes for frequency multiplexed PRACH occasions; second, in increasing order of time resource indexes for time multiplexed PRACH occasions within a PRACH slot and Third, in increasing order of indexes for PRACH slots.
If the field is absent the UE uses the RA occasion associated with the SSB that is QCLed with this CSI-RS.
ra-PreambleIndex
The RA preamble index to use in the RA occasions associated with this CSI-RS. If the field is absent, the UE uses the preamble index associated with the SSB that is QCLed with this CSI-RS.
BFR-SSB-Resource field descriptions
ra-PreambleIndex
The preamble index that the UE shall use when performing BFR upon selecting the candidate beams identified by this SSB.
ssb
The ID of an SSB transmitted by this serving cell. It determines a candidate beam for beam failure recovery (BFR).

TABLE 3a

RadioLinkMonitoringConfig information element

```
-- ASN1START
-- TAG-RADIOLINKMONITORINGCONFIG-START
RadioLinkMonitoringConfig   ::=     SEQUENCE {
   failureDetectionResourcesToAddModList   SEQUENCE
(SIZE(1..maxNrofFailureDetectionResources) )  OF   RadioLinkMonitoringRS
                                                OPTIONAL,  --  Need N
   failureDetectionResourcesToReleaseList   SEQUENCE
(SIZE(1..maxNrofFailureDetectionResources) )  OF   RadioLinkMonitoringRS-Id
                                                OPTIONAL, -- Need N
   beamFailureInstanceMaxCount       ENUMERATED  {n1,  n2,  n3,  n4,  n5,  n6,  n8,
n10}             OPTIONAL,  --   Need R
   beamFailureDetectionTimer        ENUMERATED  {pbfd1,  pbfd2,  pbfd3,  pbfd4,
pbfd5,  pbfd6,  pbfd8,  pbfd10}  OPTIONAL,  --  Need R
   . . .
}
RadioLinkMonitoringRS   ::=       SEQUENCE  {
   radioLinkMonitoringRS-Id       RadioLinkMonitoringRS-Id,
   purpose           ENUMERATED  {beamFailure,  rlf,  both},
   detectionResource         CHOICE  {
      ssb-Index         SSB-Index,
      csi-RS-Index         NZP-CSI-RS-ResourceId
   },
   . . .
}
-- TAG-RADIOLINKMONITORINGCONFIG-STOP
-- ASN1STOP
```

TABLE 3b

RadioLinkMonitoringConfig field descriptions

RadioLinkMonitoringConfig field descriptions
beamFailureDetection Timer
Timer for beam failure detection (see [TS38321], clause 5.17). See also the BeamFailureRecoveryConfig IE. Value in number of "$Q_{out,LR}$ reporting periods of Beam Failure Detection" Reference Signal (see [TS38213], clause 6). Value pbfd1 corresponds to 1 $Q_{out,LR}$ reporting period of Beam Failure Detection Reference Signal, value pbfd2 corresponds to 2 $Q_{out,LR}$ reporting periods of Beam Failure Detection Reference Signal and so on.
beamFailureInstanceMaxCount
This field determines after how many beam failure events the UE triggers beam failure recovery (see [TS38321], clause 5.17). Value n1 corresponds to 1 beam failure instance, value n2 corresponds to 2 beam failure instances and so on.
failureDetectionResourcesToAddModList
A list of reference signals for detecting beam failure and/or cell level radio link failure (RLF). The limits of the reference signals that the network can configure are specified in [TS38213], table 5-1. The network configures at most two detectionResources per BWP for the purpose beamFailure or both. If no RSs are provided for the purpose of beam failure detection, the UE performs beam monitoring based on the activated TCI-State for PDCCH as described in [TS38213], clause 6. If no RSs are provided in this list for the purpose of RLF detection, the UE performs Cell-RLM based on the activated TCI-State of PDCCH as described in [TS38213], clause 5. The network ensures that the UE has a suitable set of reference signals for performing cell-RLM.

Additionally or alternatively, the RRC layer may configure the UE 102 with various parameters for BFD and BFR using the BeamFailureRecoverySCellConfig IE, which is used to configure the UE 102 with candidate beams for BFR in case of BFD in an SCell. The RRC layer may configure some or all of the parameters in the BeamFailureRecoverySCellConfig IE for the SCell BFD and BFR procedures as shown by Table 4a and Table 4b.

TABLE 4a

BeamFailureRecoverySCellConfig information element

-- ASN1START
-- TAG-BEAMFAILURERECOVERYSCELLCONFIG-START
BeamFailureRecoverySCellConfig-r16 ::= SEQUENCE {
   rsrp-ThresholdBFR-r16      RSRP-Range
OPTIONAL, -- Need M TABLE 4a-continued BeamFailureRecoverySCellConfig information element candidateBeamRSSCellList-r16     SEQUENCE
        (SIZE(1..maxNrofCandidateBeams-r16)) OF CandidateBeamRS-r16 OPTIONAL, -- Need M
   ...
}
CandidateBeamRS-r16 ::= SEQUENCE {
   candidateBeamConfig-r16     CHOICE {
      ssb-r16      SSB-Index,
      csi-RS-r16      NZP-CSI-RS-ResourceId
   },
   servingCellId      ServCellIndex
OPTIONAL -- Need R
}
-- TAG-BEAMFAILURERECOVERYSCELLCONFIG-STOP
-- ASN1STOP TABLE 4b BeamFailureRecoverySCellConfig field descriptions BeamFailureRecoverySCellConfig field descriptions candidateBeamConfig Indicates the resource (i.e. SSB or CSI-RS) defining this beam resource.

candidateBeamRSSCellList

A list of reference signals (CSI-RS and/or SSB) identifying the candidate beams for recovery. The network always configures this parameter in every instance of this IE.

rsrp-ThresholdBFR

L1-RSRP threshold used for determining whether a candidate beam may be included by the UE be in BFR MAC CE (see [TS38213], clause X). The network always configures this parameter in every instance of this IE.

servingCellId

If the field is absent, the RS belongs to the serving cell in which this BeamFailureSCellRecovetyConfig is configured Additionally, the ServCellIndex mentioned previously may be indicated using a ServCellIndex IE, which is shown by Table 5. The ServCellIndex IE concerns a short identity, used to identify a serving cell (e.g., the PCell, the PSCell, or an SCell). A value of 0 applies for the PCell, while the SCellIndex that has previously been assigned applies for SCells.

TABLE 5

ServCellIndex information element

```
-- ASN1START
-- TAG-SERVCELLINDEX-START
ServCellIndex : :=            INTEGER    (0..maxNrofServingCells-1)
-- TAG-SERVCELLINDEX-STOP
-- ASN1STOP
```

For each Serving Cell configured for BFD, if beam failure instance indication has been received from lower layers: start or restart the beamFailureDetectionTimer; increment BFI_COUNTER by 1; and if BFI_COUNTER>=beamFailureInstanceMaxCount, and if the Serving Cell is an SCell, the MAC entity triggers a BFR for this Serving Cell. Otherwise, the MAC entity initiates an RA procedure (see e.g., clause 5.1 of [TS38213]) on the SpCell.

If the beamFailureDetectionTimer expires, or if beamFailureDetectionTimer, beamFailureInstanceMaxCount, or any of the reference signals used for beam failure detection is reconfigured by upper layers associated with this Serving Cell, the MAC entity sets BFI_COUNTER to 0. The BFI_COUNTER (per Serving Cell) is a counter for beam failure instance indication, which is initially set to 0.

If the Serving Cell is an SCell, and a PDCCH addressed to a Cell Radio Network Temporary Identifier (C-RNTI) indicating uplink grant for a new transmission is received for the HARQ process used for the transmission of the BFR MAC CE 802, 803 or truncated BFR MAC CE 802, 803, which contains BFR information of the Serving Cell. If the SCell is deactivated as specified in clause 5.9 of [TS38213], then the MAC entity sets BFI_COUNTER to 0 and considers the BFR procedure successfully completed and cancels all the triggered BFRs for this Serving Cell.

If the BFR procedure determines that at least one BFR has been triggered and not cancelled, if UL-SCH resources are available for a new transmission, and if the UL-SCH resources can accommodate the BFR MAC CE 802, 803 plus its subheader as a result of LCP, then the MAC entity instructs the Multiplexing and Assembly procedure to generate a BFR MAC CE 802 or 803. Additionally or alternatively, if UL-SCH resources are available for a new transmission and if the UL-SCH resources can accommodate the truncated BFR MAC CE 802, 803 plus its subheader as a result of LCP, the MAC entity instructs the Multiplexing and Assembly procedure to generate the truncated BFR MAC CE 802 or 803. Otherwise, the MAC entity triggers the SR for SCell BFR for each SCell for which BFR has been triggered and not cancelled. The MAC entity may trigger the SR for SCell BFR as previously described with respect to FIGS. 1-7. All BFRs triggered prior to MAC PDU assembly for SCell BFR may be cancelled when a MAC PDU is transmitted and that PDU includes a BFR MAC CE or truncated BFR MAC CE, which contains beam failure information (or NBI) of that SCell.

In general, an SR used for requesting UL-SCH resources for new transmission. The MAC entity may be configured with zero or more SR configurations. An SR configuration includes a set of PUCCH resources for SR across different BWPs and cells. At least one (and sometimes at most one) PUCCH resource for SR is configured per BWP for SCell BFR, and an SCell BFR may be mapped to zero or one SR configuration, which is configured by RRC.

2. Hardware Systems and Configurations

Figure 9:
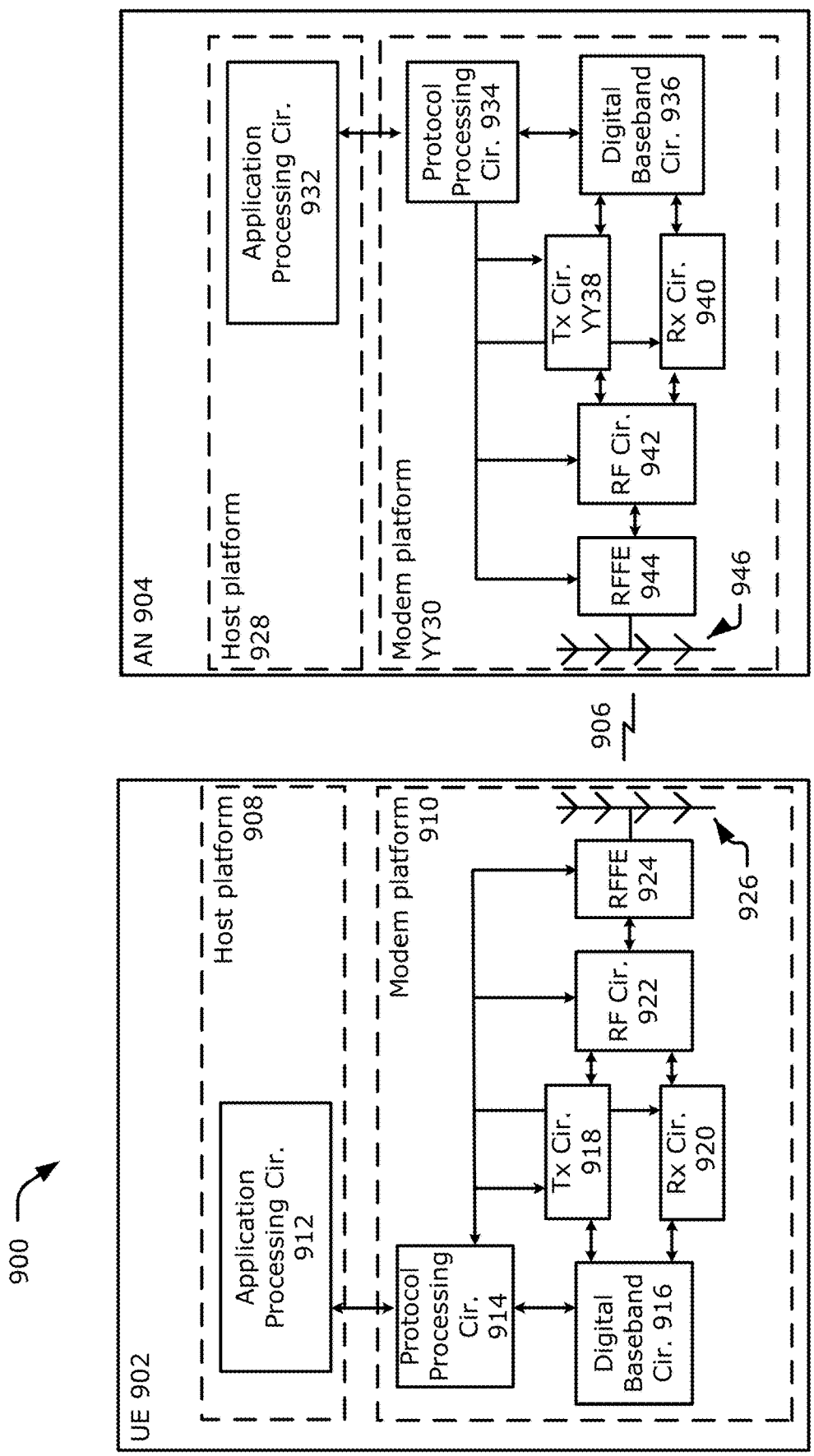
FIG. 9 schematically illustrates a wireless network in accordance with various embodiments.

FIG. 9 schematically illustrates a wireless network 900 in accordance with various embodiments. The wireless network 900 may include a UE 902 in wireless communication with an AN 904. The UE 902 and AN 904 may be similar to, and substantially interchangeable with, like-named components described elsewhere herein.

The UE 902 may be communicatively coupled with the AN 904 via connection 906. The connection YY06 is illustrated as an air interface to enable communicative coupling, and can be consistent with cellular communications protocols such as an LTE protocol or a 5G NR protocol operating at mmWave or sub-6 GHz frequencies.

The UE 902 may include a host platform 908 coupled with a modem platform 910. The host platform 908 may include application processing circuitry 912, which may be coupled with protocol processing circuitry 914 of the modem platform 910. The application processing circuitry 912 may run various applications for the UE 902 that source/sink application data. The application processing circuitry 912 may further implement one or more layer operations to transmit/receive application data to/from a data network. These layer operations may include transport (for example UDP) and Internet (for example, IP) operations The protocol processing circuitry 914 may implement one or more of layer operations to facilitate transmission or reception of data over the connection 906. The layer operations implemented by the protocol processing circuitry 914 may include, for example, MAC, RLC, PDCP, RRC and NAS operations.

The modem platform 910 may further include digital baseband circuitry 916 that may implement one or more layer operations that are "below" layer operations performed by the protocol processing circuitry 914 in a network protocol stack. These operations may include, for example, PHY operations including one or more of HARQ acknowledgement (ACK) functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 910 may further include transmit circuitry 918, receive circuitry 920, RF circuitry 922, and RF front end (RFFE) 924, which may include or connect to one or more antenna panels 926. Briefly, the transmit circuitry 918 may include a digital-to-analog converter, mixer, intermediate frequency (IF) components, etc.; the receive circuitry 920 may include an analog-to-digital converter, mixer, IF components, etc.; the RF circuitry 922 may include a low-noise amplifier, a power amplifier, power tracking components, etc.; RFFE 924 may include filters (for example, surface/bulk acoustic wave filters), switches, antenna tuners, beamforming components (for example, phase-array antenna components), etc. The selection and arrangement of the components of the transmit circuitry 918, receive circuitry 920, RF circuitry 922, RFFE 924, and antenna panels 926 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 914 may include one or more instances of control circuitry (not shown) to provide control functions for the transmit/receive components.

A UE 902 reception may be established by and via the antenna panels 926, RFFE 924, RF circuitry 922, receive circuitry 920, digital baseband circuitry 916, and protocol processing circuitry 914. In some embodiments, the antenna panels 926 may receive a transmission from the AN 904 by receive-beamforming signals received by a plurality of antennas/antenna elements of the one or more antenna panels 926.

A UE 902 transmission may be established by and via the protocol processing circuitry 914, digital baseband circuitry 916, transmit circuitry 918, RF circuitry 922, RFFE 924, and antenna panels 926. In some embodiments, the transmit components of the UE 904 may apply a spatial filter to the data to be transmitted to form a transmit beam emitted by the antenna elements of the antenna panels 926.

Similar to the UE 902, the AN 904 may include a host platform 928 coupled with a modem platform 930. The host platform 928 may include application processing circuitry 932 coupled with protocol processing circuitry 934 of the modem platform 930. The modem platform may further include digital baseband circuitry 936, transmit circuitry 938, receive circuitry 940, RF circuitry 942, RFFE circuitry 944, and antenna panels 946. The components of the AN 904 may be similar to and substantially interchangeable with like-named components of the UE 902. In addition to performing data transmission/reception as described above, the components of the AN 908 may perform various logical functions that include, for example, RNC functions such as radio bearer management, uplink and downlink dynamic radio resource management, and data packet scheduling.

Figure 10:
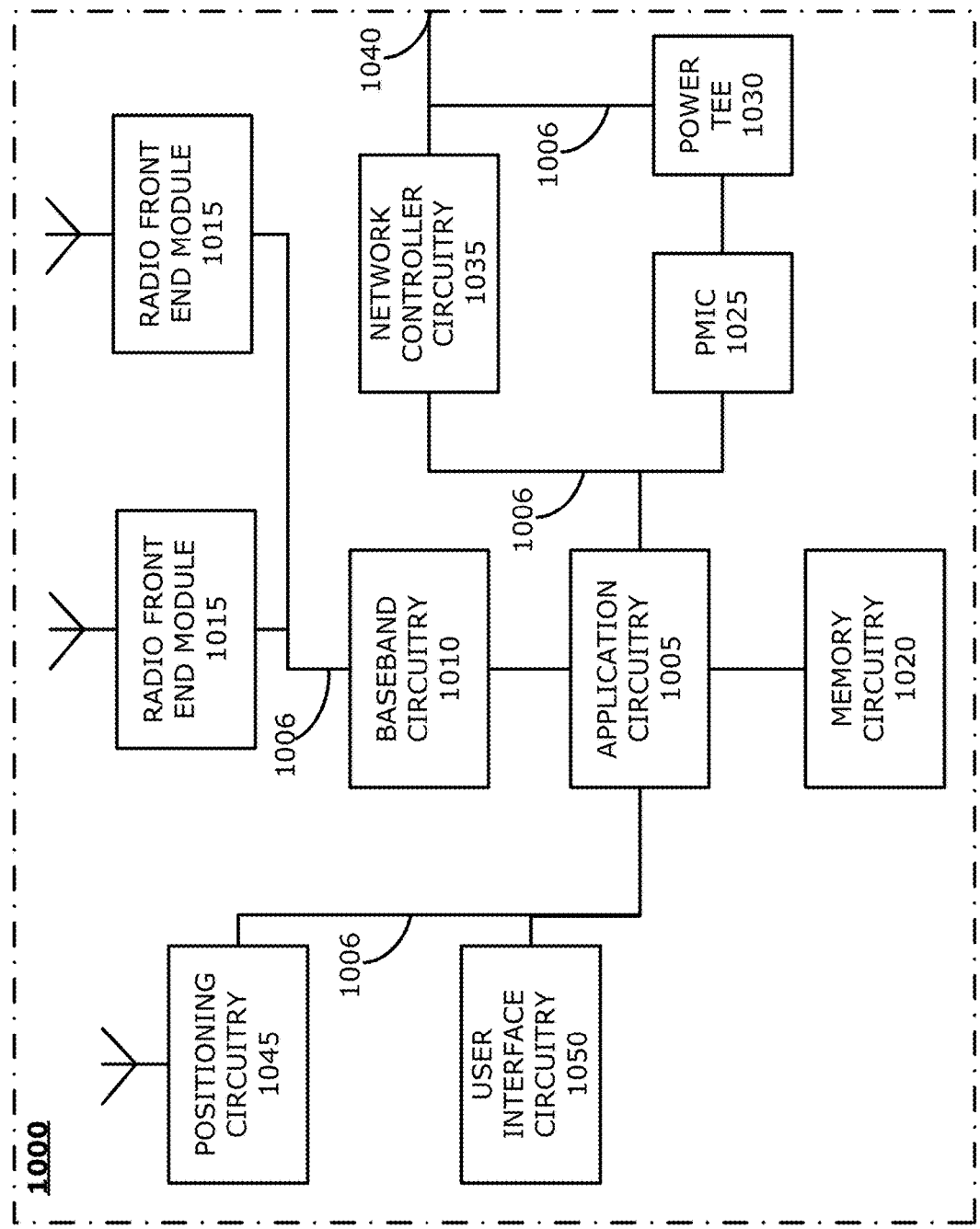
FIG. 10 illustrates an example of infrastructure equipment in accordance with various embodiments.

FIG. 10 illustrates an example of infrastructure equipment 1000 in accordance with various embodiments. The infrastructure equipment 1000 (or "system 1000") may be implemented as a base station, radio head, access network node, and/or any other element/device discussed herein. In other examples, the system 1000 could be implemented in or by an intermediate node 1220 or endpoint 1210.

The system 1000 includes application circuitry 1005, baseband circuitry 1010, one or more RFEMs 1015, memory circuitry 1020, PMIC 1025, power tee circuitry 1030, network controller circuitry 1035, network interface connector 1040, positioning circuitry 1045, and user interface 1050. In some embodiments, the device 1000 may include additional elements such as, for example, memory/storage, display, camera, sensor, or I/O interface. In other embodiments, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose I/O, memory card controllers such as Secure Digital (SD) MultiMediaCard (MMC) or similar, USB interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores, CPUs, application processors, GPUs, RISC processors, one or more Acorn RISC Machine (ARM) processors, CISC processors, one or more DSPs, one or more FPGAs, one or more PLDs, one or more ASICs, one or more microprocessors or controllers, or any suitable combination thereof. In some embodiments, the application circuitry 1005 may comprise, or may be, a special-purpose processor/controller to operate according to the various embodiments herein. As examples, the processor(s) of application circuitry 1005 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1000 may not utilize application circuitry 1005, and instead may include a special-purpose processor/controller to process IP data received from an EPC or 5GC, for example.

In some implementations, the application circuitry 1005 may include one or more hardware accelerators, which may be microprocessors, programmable processing devices, or the like. The one or more hardware accelerators may include, for example, computer vision and/or deep learning accelerators. As examples, the programmable processing devices may be one or more FPGAs; programmable logic devices (PLDs) such as CPLDs, HCPLDs, and the like; ASICs such as structured ASICs and the like; programmable SoCs; and/or the like. In such implementations, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., EPROM, EEPROM, flash memory, static memory (e.g., SRAM, anti-fuses, etc.)) used to store logic blocks, logic fabric, data, etc. in look-up-tables (LUTs) and the like.

In some implementations, such as implementations where subsystems of the edge nodes 1230, intermediate nodes 1220, and/or endpoints 1210 of FIG. 12 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 1005 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 1010 may be implemented, for example, as a solder-down substrate including one or more integrated circuits, a single packaged integrated circuit soldered to a main circuit board or a multi-chip module containing two or more integrated circuits. The baseband circuitry 1010 includes one or more processing devices (e.g., baseband processors) to carry out various protocol and radio control functions. Baseband circuitry 1010 may interface with application circuitry of system 1000 for generation and processing of baseband signals and for controlling operations of the RFEMs 1015. The baseband circuitry 1010 may handle various radio control functions that enable communication with one or more radio networks via the RFEMs 1015. The baseband circuitry 1010 may include circuitry such as, but not limited to, one or more single-core or multi-core processors (e.g., one or more baseband processors) or control logic to process baseband signals received from a receive signal path of the RFEMs 1015, and to generate baseband signals to be provided to the RFEMs 1015 via a transmit signal path. In various embodiments, the baseband circuitry 1010 may implement a RTOS to manage resources of the baseband circuitry 1010, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 10, in one embodiment, the baseband circuitry 1010 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 1015 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 1015 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1010 and/or RFEMs 1015. The baseband circuitry 1010 may also support radio communications for more than one wireless protocol.

Continuing with the aforementioned embodiment, the baseband circuitry 1010 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include FFT, precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 1050 may include one or more user interfaces designed to enable user interaction with the system 1000 or peripheral component interfaces designed to enable peripheral component interaction with the system 1000. User interfaces may include, but are not limited to, one or more physical or virtual buttons (e.g., a reset button), one or more indicators (e.g., LEDs), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a USB port, an audio jack, a power supply interface, etc.

The RFEMs 1015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1015, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 1010 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 1020 may include one or more of volatile memory including DRAM and/or SDRAM, and nonvolatile memory including high-speed electrically erasable memory (commonly referred to as Flash memory), PRAM, MRAM, etc., and may incorporate the 3D crosspoint (XPOINT) memories from Intel® and Micron®. Memory circuitry 1020 may be implemented as one or more of solder down packaged integrated circuits, socketed memory modules and plug-in memory cards. The memory circuitry 1020 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 1000, an operating system of infrastructure equipment 1000, one or more applications, and/or for carrying out the embodiments discussed herein. The computational logic may be stored or loaded into memory circuitry 1020 as instructions for execution by the processors of the application circuitry 1005 to provide or perform the functions described herein. The various elements may be implemented by assembler instructions supported by processors of the application circuitry 1005 or high-level languages that may be compiled into such instructions. The permanent copy of the programming instructions may be placed into persistent storage devices of memory circuitry 1020 in the factory during manufacture, or in the field through, for example, a distribution medium (not shown), through a communication interface (e.g., from a distribution server), and/or OTA.

The PMIC 1025 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1030 may provide for electrical power drawn from a network cable to provide both power supply and data connectivity to the infrastructure equipment 1000 using a single cable.

The network controller circuitry 1035 provides connectivity to a network using a standard network interface protocol such as Ethernet, Ethernet over GRE Tunnels, Ethernet over MPLS, or some other suitable protocol, such as those discussed herein. Network connectivity may be provided to/from the infrastructure equipment 1000 via network interface connector 1040 using a physical connection, which may be electrical (commonly referred to as a "copper interconnect"), optical, or wireless. The network controller circuitry 1035 may include one or more dedicated processors and/or FPGAs to communicate using one or more of the aforementioned protocols. In some implementations, the network controller circuitry 1035 may include multiple controllers to provide connectivity to other networks using the same or different protocols. In various embodiments, the network controller circuitry 1035 enables communication with associated equipment and/or with a backend system (e.g., server(s) 1230 of FIG. 12), which may take place via a suitable gateway device.

The positioning circuitry 1045 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-Technology for Positioning, Navigation, and Timing (Micro-PNT) IC that uses a master timing clock to perform position tracking/estimation without GNSS assistance. The positioning circuitry 1045 may also be part of, or interact with, the baseband circuitry 1010 and/or RFEMs 1015 to communicate with the nodes and components of the positioning network. The positioning circuitry 1045 may also provide position data and/or time data to the application circuitry 1005, which may use the data to synchronize operations with various other infrastructure equipment, or the like.

The components shown by FIG. 10 may communicate with one another using interface circuitry 1006 or IX 1006, which may include any number of bus and/or IX technologies such as ISA, extended ISA, I²C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

Figure 11:
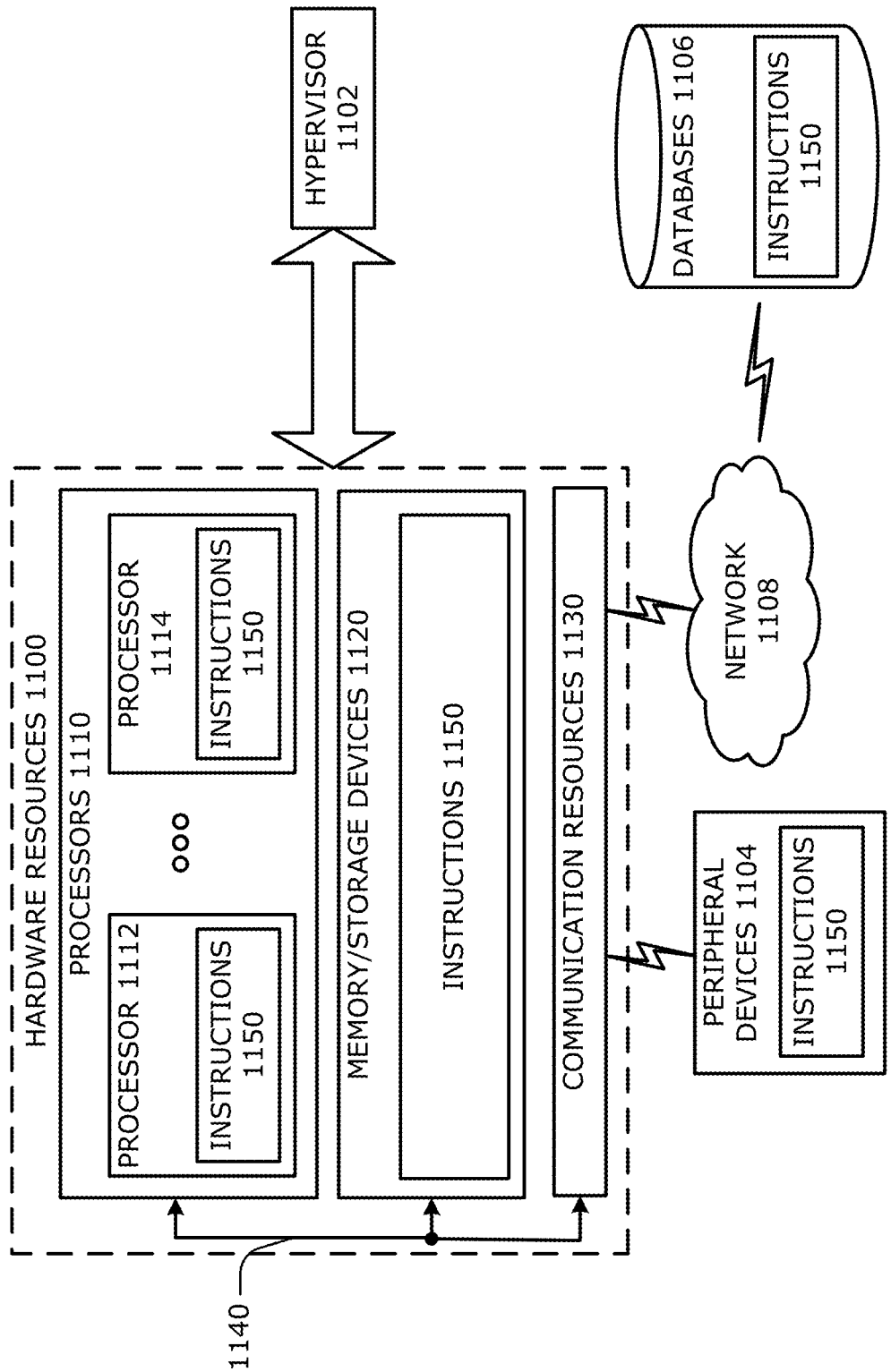
FIG. 11 illustrates components of a computing device according to some example embodiments.

FIG. 11 illustrates components of a computing device 1100 according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140 or other interface circuitry. For embodiments where node virtualization (e.g., NFV) is utilized, a hypervisor 1102 may be executed to provide an execution environment for one or more network slices/subslices to utilize the hardware resources 1100.

The processors 1110 include, for example, processor 1112 and processor 1114. The processors 1110 include circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. The processors 1110 may be, for example, a central processing unit (CPU), reduced instruction set computing (RISC) processors, Acorn RISC Machine (ARM) processors, complex instruction set computing (CISC) processors, graphics processing units (GPUs), one or more Digital Signal Processors (DSPs) such as a baseband processor, Application-Specific Integrated Circuits (ASICs), an Field-Programmable Gate Array (FPGA), a radio-frequency integrated circuit (RFIC), one or more microprocessors or controllers, another processor (including those discussed herein), or any suitable combination thereof. In some implementations, the processor circuitry 1110 may include one or more hardware accelerators, which may be microprocessors, programmable processing devices (e.g., FPGA, complex programmable logic devices (CPLDs), etc.), or the like.

The memory/storage devices 1120 may include main memory, disk storage, or any suitable combination thereof. The memory/storage devices 1120 may include, but are not limited to, any type of volatile, non-volatile, or semi-volatile memory such as random access memory (RAM), dynamic RAM (DRAM), static RAM (SRAM), synchronous DRAM (SDRAM), erasable programmable read-only memory (EPROM), electrically erasable programmable read-only memory (EEPROM), Flash memory, solid-state storage, phase change RAM (PRAM), resistive memory such as magnetoresistive random access memory (MRAM), etc., and may incorporate three-dimensional (3D) cross-point (XPOINT) memories from Intel® and Micron®. The memory/storage devices 1120 may also comprise persistent storage devices, which may be temporal and/or persistent storage of any type, including, but not limited to, non-volatile memory, optical, magnetic, and/or solid state mass storage, and so forth.

The communication resources 1130 may include interconnection or network interface controllers, components, or other suitable devices to communicate with one or more peripheral devices 1104 or one or more databases 1106 or other network elements via a network 1108. For example, the communication resources 1130 may include wired communication components (e.g., for coupling via USB, Ethernet, Ethernet, Ethernet over GRE Tunnels, Ethernet over Multiprotocol Label Switching (MPLS), Ethernet over USB, Controller Area Network (CAN), Local Interconnect Network (LIN), DeviceNet, ControlNet, Data Highway+, PROFIBUS, or PROFINET, among many others), cellular communication components, NFC components, Bluetooth® (or Bluetooth® Low Energy) components, WiFi® components, and other communication components. Network connectivity may be provided to/from the computing device 1100 via the communication resources 1130 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The communication resources 1130 may include one or more dedicated processors and/or FPGAs to communicate using one or more of the aforementioned network interface protocols.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

3. Example Implementations

Additional examples of the presently described embodiments include the following, non-limiting implementations. Each of the following non-limiting examples may stand on its own or may be combined in any permutation or combination with any one or more of the other examples provided below or throughout the present disclosure.

Example A01 includes a method of operating a user equipment (UE), the method comprising: in response to detection of a beam failure event in a secondary cell (SCell): determining one or more beams of the SCell on which to camp, generating new beam information (NBI) to indicate the determined beams, and sending the NBI to a Radio Access Network (RAN) node over an uplink (UL) channel in the SCell or a UL channel in a primary cell (PCell) associated with the SCell.

Example A02 includes the method of example A01 and/or some other example(s) herein, wherein determining the one or more beams comprises: performing measurement of beam failure detection (BFR) reference signals; and determining the one or more beams to be beams associated with the measured BFR reference signals having a signal strength above a configured threshold.

Example A03 includes the method of example A02 and/or some other example(s) herein, wherein generating the NBI comprises: performing measurement of beam failure detection (BFR) reference signals; and determining the one or more beams to be beams associated with the measured BFR reference signals having a signal strength above a configured threshold.

Example A04 includes the method of example A03 and/or some other example(s) herein, wherein generating the NBI comprises: generating a Medium Access Control (MAC) Control Element (CE) to include a reference signal identifier of each measured BFR reference signal having a signal strength above the configured threshold.

Example A05 includes the method of examples A01-A04 and/or some other example(s) herein, wherein the UL channel in the SCell is a Physical Random Access Channel (PRACH), and sending the NBI to the RAN node over the UL channel in the SCell comprises: transmit the NBI over preconfigured random access channel (RACH) resources on the SCell.

Example A06 includes the method of example A05 and/or some other example(s) herein, further comprising: receiving a BFR configuration in a BFR Control Resource Set (CORESET) of a Physical Downlink Control Channel (PDCCH) on the SCell that is quasi co-located (QCL'd) with the determined NBI, the BFR configuration to indicate at least one beam indicated by the NBI.

Example A07 includes the method of example A06 and/or some other example(s) herein, further comprising: monitoring a BFR CORESET QCL'd with the determined NBI for the PDCCH transmission including the BFR configuration.

Example A08 includes the method of examples A01-A04 and/or some other example(s) herein, further comprising: transmitting a BFR request (BFRQ) to the RAN node over Physical Uplink Control Channel (PUCCH) resources of a dedicated scheduling request (SR) on the PCell; and receiving PCell downlink control information (DCI) in response to the BFRQ.

Example A09 includes the method of example A08 and/or some other example(s) herein, wherein, the UL channel in the SCell is a PRACH, the DCI to include a BFR PDCCH order-like RACH configuration, and sending the NBI to the RAN node over the UL channel in the SCell comprises: selecting at least one RACH occasion during which to transmit the NBI based on a set of PRACH association periods indicated by the BFR PDCCH order-like RACH configuration; and transmitting the NBI on the PRACH of the SCell during the selected RACH occasion.

Example A10 includes the method of example A09 and/or some other example(s) herein, wherein selecting the at least one RACH occasion comprises: selecting the at least one RACH occasion as being a RACH occasion corresponding to a measured synchronization signal block (SSB) that is above a configured measurement threshold.

Example A11 includes the method of examples A08-A10 and/or some other example(s) herein, wherein the UL channel in the SCell is a Physical Uplink Shared Channel (PUSCH), the DCI is to include a Physical Uplink Shared Channel (PUSCH) UL grant for the SCell, and sending the NBI to the RAN node over the UL channel in the SCell comprises: repeatedly transmitting the NBI over PUSCH resources indicated by the PUSCH UL grant.

Example A12 includes the method of examples A08-A11 and/or some other example(s) herein, wherein the UL channel in the SCell is a Physical Uplink Shared Channel (PUSCH), the DCI is to include a Physical Uplink Shared Channel (PUSCH) UL grant for the SCell, and sending the NBI to the RAN node over the UL channel in the SCell comprises: selecting a spatial filter to be used for transmission of the PUSCH, the selected spatial filter different than a spatial filter used for forming a beam of the detected beam failure event transmitting the NBI over PUSCH resources indicated by the PUSCH UL grant using the selected spatial filter.

Example A13 includes the method of examples A02-A12 and/or some other example(s) herein, wherein the BFR reference signals are Synchronization Signal Blocks (SSBs) or Channel State Information Reference Signals (CSI-RSs).

Example B01 includes a method of operating a Radio Access Network (RAN) node, the method comprising: receiving over an uplink (UL) channel in a secondary cell (SCell) or a UL channel in a primary cell (PCell) associated with the SCell, new beam information (NBI) from a user equipment (UE) based on a detected beam failure event on the SCell, the NBI to indicate one or more candidate beams of the SCell; determining the BFR configuration for the UE based on the NBI; and transmitting a beam failure detection (BFR) configuration to the UE for use of at least one beam of the one or more candidate beams.

Example B02 includes the method of example B01 and/or some other example(s) herein, wherein the one or more candidate beams are beams associated with measured BFR reference signals having a signal strength above a configured threshold.

Example B03 includes the method of example B02 and/or some other example(s) herein, wherein the BFR reference signals are Synchronization Signal Blocks (SSBs) or Channel State Information Reference Signals (CSI-RSs).

Example B04 includes the method of examples B02-B03 and/or some other example(s) herein, wherein the NBI is included in a Medium Access Control (MAC) Control Element (CE), the MAC CE to include a reference signal identifier of each measured BFR reference signal having a signal strength above the configured threshold.

Example B05 includes the method of examples B01-B04 and/or some other example(s) herein, wherein the UL channel in the SCell is a Physical Random Access Channel (PRACH), and the NBI is obtained over preconfigured random access channel (RACH) resources on the SCell.

Example B06 includes the method of example B05 and/or some other example(s) herein, wherein transmitting the BFR configuration to the UE comprises: transmitting the BFR configuration to the UE over a Beam Failure Recovery (BFR) Control Resource Set (CORESET) of a Physical Downlink Control Channel (PDCCH) on the SCell that is quasi co-located (QCL'd) with the at least one beam.

Example B07 includes the method of examples B01-B04 and/or some other example(s) herein, further comprising: receiving a BFR request (BFRQ) from the UE over Physical Uplink Control Channel (PUCCH) resources of a dedicated scheduling request (SR) on the PCell; and transmitting downlink control information (DCI) in the PCell in response to receipt of the BFRQ.

Example B08 includes the method of example B07 and/or some other example(s) herein, wherein the DCI is to include a BFR PDCCH order-like RACH configuration, the BFR PDCCH order-like RACH configuration is to indicate a set of PRACH association periods, and the method comprises: receiving the NBI on a PRACH of the SCell during a UE-selected RACH occasion, the UE-selected RACH occasion being based on the set of PRACH association periods and corresponding to a measured BFR reference signal that is above a configured measurement threshold.

Example B09 includes the method of example B08 and/or some other example(s) herein, wherein the DCI is to include a Physical Uplink Shared Channel (PUSCH) UL grant for the SCell, and receiving the NBI comprises: performing beam sweeping over multiple PUSCH transmissions to obtain the NBI; or performing PUSCH combining over multiple PUSCH transmissions to obtain the NBI.

Example C01 includes a method of operating a user equipment (UE), the method comprising: detecting a beam failure in a secondary cell (SCell); determining candidate beams of the SCell based on measurement of corresponding Beam Failure Detection (BFD) reference signals; generating a Beam Failure Recovery (BFR) Medium Access Control (MAC) Control Element (CE) to include reference signal identifiers (IDs) of respective candidate beams whose corresponding reference signals have a signal strength above a configured threshold; transmitting the BFR MAC CE to a Radio Access Network (RAN) node over the SCell or a primary cell (PCell) associated with the SCell; and receiving a BFR configuration in a BFR Control Resource Set (CORESET) of a Physical Downlink Control Channel (PDCCH) on the SCell that is quasi co-located (QCL'd) with a candidate beam indicated by the BFR MAC CE, the BFR configuration to include parameters for use of the candidate beam.

Example C02 includes the method of example C01 and/or some other example(s) herein, further comprising: transmitting the BFR MAC CE over a Physical Uplink Shared Channel (PUSCH) of the SCell using an available uplink grant.

Example C03 includes the method of example C01 and/or some other example(s) herein, further comprising: selecting a Random Access Channel (RACH) occasion during which to transmit the BFR MAC CE based on a set of PRACH association periods indicated by a Physical Downlink Control Channel (PDCCH) ordered RACH configuration; and transmitting the BFR MAC CE over a PRACH of the SCell during the selected RACH occasion.

Example C04 includes the method of example C01 and/or some other example(s) herein, further comprising: receiving Downlink Control Information (DCI) over a PCell, the DCI to include an uplink grant for a Physical Uplink Shared Channel (PUSCH) of the SCell; and transmitting the BFR MAC CE over the PUSCH of the SCell according to the uplink grant included in the DCI.

Example Z01 includes an apparatus comprising means to perform one or more elements of a method described in or related to any of examples A01-A13, B01-B09, C01-C04, or any other method or process described herein. Example Z02 includes one or more non-transitory computer-readable media comprising instructions to cause an electronic device, upon execution of the instructions by one or more processors of the electronic device, to perform one or more elements of a method described in or related to any of examples A01-A13, B01-B09, C01-C04, or any other method or process described herein. Example Z03 includes an apparatus comprising logic, modules, or circuitry to perform one or more elements of a method described in or related to any of examples A01-A13, B01-B09, C01-C04, or any other method or process described herein. Example Z04 includes a method, technique, or process as described in or related to any of examples A01-A13, B01-B09, C01-C04, or portions or parts thereof. Example Z05 includes an apparatus comprising: one or more processors and one or more computer-readable media comprising instructions that, when executed by the one or more processors, cause the one or more processors to perform the method, techniques, or process as described in or related to any of examples A01-A13, B01-B09, C01-C04, or portions thereof. Example Z06 includes a signal as described in or related to any of examples A01-A13, B01-B09, C01-C04, or portions or parts thereof. Example Z07 includes a datagram, packet, frame, segment, protocol data unit (PDU), or message as described in or related to any of examples A01-A13, B01-B09, C01-C04, or portions or parts thereof, or otherwise described in the present disclosure. Example Z08 includes a signal encoded with data as described in or related to any of examples A01-A13, B01-B09, C01-C04, or portions or parts thereof, or otherwise described in the present disclosure. Example Z09 includes a signal encoded with a datagram, packet, frame, segment, protocol data unit (PDU), or message as described in or related to any of examples A01-A13, B01-B09, C01-C04, or portions or parts thereof, or otherwise described in the present disclosure. Example Z10 includes an electromagnetic signal carrying computer-readable instructions, wherein execution of the computer-readable instructions by one or more processors is to cause the one or more processors to perform the method, techniques, or process as described in or related to any of examples A01-A13, B01-B09, C01-C04, or portions thereof. Example Z11 includes a computer program comprising instructions, wherein execution of the program by a processing element is to cause the processing element to carry out the method, techniques, or process as described in or related to any of examples A01-A13, B01-B09, C01-C04, or portions thereof. Example Z12 includes a signal in a wireless network as shown and described herein. Example Z13 includes a method of communicating in a wireless network as shown and described herein. Example Z14 includes a system for providing wireless communication as shown and described herein. Example Z15 includes a device for providing wireless communication as shown and described herein.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

IV. Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "SMTC" refers to an SSB-based measurement timing configuration configured by SSB-MeasurementTimingConfiguration. The term "SSB" refers to an SS/PBCH block. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with carrier aggregation (CA). The term "Special Cell" refers to the PCell of the MCG or the PSCell of the SCG for DC operation; otherwise, the term "Special Cell" refers to the Pcell.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-GSB, ITS-GSC, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. One or more non-transitory computer-readable media (NTCRM) comprising instructions for beam failure recovery (BFR), wherein execution of the instructions by one or more processors is to cause a user equipment (UE) to:
in response to detection of a beam failure event in a secondary cell (SCell),
determine one or more beams of the SCell on which to camp, wherein the determination of the one or more beams includes:
determine a set of beam failure detection (BFD)-reference signals (RSs) to measure based on a received BFD configuration,
perform measurement of the set of BFD-RSs, and
determine the one or more beams to be beams associated with the measured BFD-RSs having a signal strength above a configured threshold; and
generate a Medium Access Control (MAC) Control Element (CE) to include an index of the SCell, indications of the determined beams, and indexes of each measured BFD-RS having a signal strength above a configured threshold, and
send the MAC CE to a Radio Access Network (RAN) node over an uplink (UL) channel in the SCell or a UL channel in a primary cell (PCell) associated with the SCell.

2. The one or more NTCRM of claim 1, wherein execution of the instructions is to cause the UE to:
declare the beam failure event in the SCell when all BFD-RSs configured to the SCell have failed.

3. The one or more NTCRM of claim 1, wherein the MAC CE is a physical uplink control channel (PUSCH) MAC CE.

4. The one or more NTCRM of claim 1, wherein the UL channel in the SCell is a Physical Random Access Channel (PRACH), and to send the MAC CE to the RAN node over the UL channel in the SCell, execution of the instructions is to cause the UE to:
transmit the MAC CE over preconfigured random access channel (RACH) resources on the SCell.

5. The one or more NTCRM of claim 4, wherein execution of the instructions is to cause the UE to:
receive a BFR configuration in a BFR Control Resource Set (CORESET) of a Physical Downlink Control Channel (PDCCH) on the SCell that is quasi co-located (QCL'd) with the determined beams, and the BFR configuration is to indicate at least one beam indicated by the MAC CE.

6. The one or more NTCRM of claim 5, wherein execution of the instructions is to cause the UE to:
monitor a BFR CORESET QCL'd with the determined beams for a PDCCH transmission including the BFR configuration.

7. The one or more NTCRM of claim 1, wherein execution of the instructions is to further cause the UE to:
transmit a BFR request (BFRQ) to the RAN node over Physical Uplink Control Channel (PUCCH) resources of a dedicated scheduling request (SR) on the PCell; and
receive PCell downlink control information (DCI) in response to the BFRQ.

8. The one or more NTCRM of claim 7, wherein, the UL channel in the SCell is a PRACH, the DCI to include a BFR PDCCH order-like RACH configuration, and to send the MAC CE to the RAN node over the UL channel in the SCell, execution of the instructions is to cause the UE to:
select at least one RACH occasion during which to transmit the MAC CE based on a set of PRACH association periods indicated by the BFR PDCCH order-like RACH configuration; and
transmit the MAC CE on the PRACH of the SCell during the selected RACH occasion.

9. The one or more NTCRM of claim 8, wherein, to select the at least one RACH occasion, execution of the instructions is to further cause the UE to:
select the at least one RACH occasion as being a RACH occasion corresponding to a measured synchronization signal block (SSB) that is above a configured measurement threshold.

10. The one or more NTCRM of claim 7, wherein the UL channel in the SCell is a PUSCH, the DCI is to include a PUSCH UL grant for the SCell, and to send the MAC CE to the RAN node over the UL channel in the SCell, execution of the instructions is to cause the UE to:
repeatedly transmit the MAC CE over PUSCH resources indicated by the PUSCH UL grant.

11. The one or more NTCRM of claim 7, wherein the UL channel in the SCell is a PUSCH, the DCI is to include a PUSCH UL grant for the SCell, and to send the MAC CE to the RAN node over the UL channel in the SCell, execution of the instructions is to cause the UE to:
select a spatial filter to be used for transmission of the PUSCH, the selected spatial filter different than a spatial filter used for forming a beam of the detected beam failure event; and
transmit the MAC CE over PUSCH resources indicated by the PUSCH UL grant using the selected spatial filter.

12. A modem platform to be employed by a user equipment (UE), the modem platform comprising:
baseband circuitry to:
detect a beam failure in a secondary cell (SCell),
determine candidate beams of the SCell on which to camp based on measurement of corresponding Beam Failure Detection (BFD) reference signals (RSs), wherein the determination of the candidate beams includes:
determine the corresponding of BFD-RSs to measure based on a received BFD configuration,
perform measurement of the corresponding of BFD-RSs, and
determine the candidate beams to be beams associated with the measured BFD-RSs having a signal strength above a configured threshold, and
generate a Beam Failure Recovery (BFR) Medium Access Control (MAC) Control Element (CE) to include reference signal identifiers (IDs) of respective candidate beams whose corresponding BFD-RSs have a signal strength above a configured threshold; and
radiofrequency (RF) circuitry coupled with the baseband circuitry, the RF circuitry to:
transmit the BFR MAC CE to a Radio Access Network (RAN) node over the SCell or a primary cell (PCell) associated with the SCell, and
receive a BFR configuration in a BFR Control Resource Set (CORESET) of a Physical Downlink Control Channel (PDCCH) on the SCell that is quasi co-located (QCL'd) with a candidate beam indicated by the BFR MAC CE, the BFR configuration to include parameters for use of the candidate beam.

13. The modem platform of claim 12, wherein the RF circuitry is to:
transmit the BFR MAC CE over a Physical Uplink Shared Channel (PUSCH) of the SCell using an available uplink grant.

14. The modem platform of claim 12, wherein:
- the baseband circuitry is to select a Random Access Channel (RACH) occasion during which to transmit the BFR MAC CE based on a set of Physical RACH (PRACH) association periods indicated by a PDCCH ordered RACH configuration; and
- the RF circuitry is to transmit the BFR MAC CE over a PRACH of the SCell during the selected RACH occasion.

15. The modem platform of claim 12, wherein the RF circuitry is to:
- receive Downlink Control Information (DCI) over a PCell, the DCI to include an uplink grant for a Physical Uplink Shared Channel (PUSCH) of the SCell; and
- transmit the BFR MAC CE over the PUSCH of the SCell according to the uplink grant included in the DCI.

* * * * *